(12) United States Patent
Hiroki et al.

(10) Patent No.: US 9,443,455 B2
(45) Date of Patent: Sep. 13, 2016

(54) DISPLAY DEVICE HAVING A PLURALITY OF PIXELS

(75) Inventors: Masaaki Hiroki, Isehara (JP); Hiroyuki Miyake, Atsugi (JP); Yoshiharu Hirakata, Ebina (JP); Jun Koyama, Sagamihara (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 224 days.

(21) Appl. No.: 13/369,695

(22) Filed: Feb. 9, 2012

(65) Prior Publication Data

US 2012/0218325 A1 Aug. 30, 2012

(30) Foreign Application Priority Data

Feb. 25, 2011 (JP) ................. 2011-039734

(51) Int. Cl.
*G09G 5/00* (2006.01)
*G09G 3/00* (2006.01)
(Continued)

(52) U.S. Cl.
CPC ............. *G09G 3/003* (2013.01); *G09G 5/02* (2013.01); *H04N 13/0409* (2013.01); *H04N 13/0413* (2013.01); *H04N 13/0454* (2013.01); *H04N 13/0475* (2013.01); *H04N 13/0497* (2013.01); *G09G 2300/023* (2013.01);
(Continued)

(58) Field of Classification Search
CPC ................... G09G 3/003; G09G 5/02
USPC ............................................. 345/6
See application file for complete search history.

(56) References Cited

U.S. PATENT DOCUMENTS

| 4,773,738 A | 9/1988 | Hayakawa et al. |
| 5,315,377 A | 5/1994 | Isono et al. |

(Continued)

FOREIGN PATENT DOCUMENTS

| CN | 1784022 | 6/2006 |
| CN | 101419350 | 4/2009 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Adam J Snyder
(74) *Attorney, Agent, or Firm* — Robinson Intellectual Property Law Office; Eric J. Robinson

(57) ABSTRACT

To extend the range of distance (between a display screen and the eye of a viewer) with which the viewer can see 3D images with the naked eye and to reduce power consumption. A parallax barrier in a shutter panel is controlled to be arranged optimally in accordance with the distance between the viewer and a display panel. Specifically, an optimal parallax barrier is formed as appropriate by selectively switching a light-transmitting state and a light-shielding state of a plurality of optical shutter regions and a display element unit of pixels depending on a retention state. The retention state is realized in such a manner that at least one of electrodes between which a liquid crystal layer is sandwiched is connected to a transistor including a semiconductor layer containing an oxide semiconductor and the transistor is turned off.

22 Claims, 12 Drawing Sheets

(51) Int. Cl.
  *G09G 5/02* (2006.01)
  *H04N 13/04* (2006.01)
(52) U.S. Cl.
  CPC .............. *G09G 2300/0426* (2013.01); *G09G 2300/0443* (2013.01); *G09G 2380/00* (2013.01)

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 5,764,321 A * | 6/1998 | Koyama et al. | 349/48 |
| 5,959,664 A | 9/1999 | Woodgate | |
| 5,969,850 A | 10/1999 | Harrold et al. | |
| 6,246,451 B1 | 6/2001 | Matsumura et al. | |
| 6,294,274 B1 | 9/2001 | Kawazoe et al. | |
| 6,307,585 B1 * | 10/2001 | Hentschke | 348/51 |
| 6,377,230 B1 | 4/2002 | Yamazaki et al. | |
| 6,496,218 B2 | 12/2002 | Takigawa et al. | |
| 6,563,174 B2 | 5/2003 | Kawasaki et al. | |
| 6,597,348 B1 | 7/2003 | Yamazaki et al. | |
| 6,727,522 B1 | 4/2004 | Kawasaki et al. | |
| 6,882,012 B2 | 4/2005 | Yamazaki et al. | |
| 6,970,290 B1 | 11/2005 | Mashitani et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,145,536 B1 | 12/2006 | Yamazaki et al. | |
| 7,193,593 B2 | 3/2007 | Koyama et al. | |
| 7,211,825 B2 | 5/2007 | Shih et al. | |
| 7,224,339 B2 | 5/2007 | Koyama et al. | |
| 7,268,756 B2 | 9/2007 | Koyama et al. | |
| 7,282,782 B2 | 10/2007 | Hoffman et al. | |
| 7,297,977 B2 | 11/2007 | Hoffman et al. | |
| 7,317,438 B2 | 1/2008 | Yamazaki et al. | |
| 7,323,356 B2 | 1/2008 | Hosono et al. | |
| 7,385,224 B2 | 6/2008 | Ishii et al. | |
| 7,385,579 B2 | 6/2008 | Satake | |
| 7,402,506 B2 | 7/2008 | Levy et al. | |
| 7,411,209 B2 | 8/2008 | Endo et al. | |
| 7,425,937 B2 | 9/2008 | Inukai | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,609,445 B2 | 10/2009 | Hamagishi | |
| 7,674,650 B2 | 3/2010 | Akimoto et al. | |
| 7,732,819 B2 | 6/2010 | Akimoto et al. | |
| 7,791,571 B2 | 9/2010 | Ohtani et al. | |
| 7,804,088 B2 | 9/2010 | Tanaka et al. | |
| 8,093,589 B2 | 1/2012 | Sugihara et al. | |
| 8,373,617 B2 | 2/2013 | Kim et al. | |
| 2001/0043292 A1 * | 11/2001 | Tsujimura | G02F 1/1368 349/43 |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0047785 A1 | 3/2003 | Kawasaki et al. | |
| 2003/0102479 A1 * | 6/2003 | Joo | H01L 29/66757 257/72 |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2004/0239231 A1 | 12/2004 | Miyagawa et al. | |
| 2004/0240777 A1 * | 12/2004 | Woodgate et al. | 385/16 |
| 2005/0001787 A1 * | 1/2005 | Montgomery et al. | 345/6 |
| 2005/0012097 A1 | 1/2005 | Yamazaki | |
| 2005/0017302 A1 | 1/2005 | Hoffman | |
| 2005/0039670 A1 | 2/2005 | Hosono et al. | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0126177 A1 * | 6/2006 | Kim et al. | 359/465 |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0091638 A1 * | 4/2007 | Ijzerman et al. | 362/611 |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0279359 A1 | 12/2007 | Yoshida et al. | |
| 2007/0279374 A1 | 12/2007 | Kimura et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0043092 A1 | 2/2008 | Evans et al. | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0102752 A1 | 4/2009 | Honda | |
| 2009/0114910 A1 | 5/2009 | Chang | |
| 2009/0114917 A1 * | 5/2009 | Yamazaki | H01L 29/66765 257/59 |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0250695 A1 * | 10/2009 | Tanaka et al. | 438/34 |
| 2009/0278122 A1 | 11/2009 | Hosono et al. | |
| 2009/0280600 A1 | 11/2009 | Hosono et al. | |
| 2009/0321737 A1 | 12/2009 | Isa et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0148177 A1 | 6/2010 | Koyama et al. | |
| 2010/0149138 A1 | 6/2010 | Lee et al. | |
| 2010/0157181 A1 * | 6/2010 | Takahashi | 349/200 |
| 2010/0182282 A1 | 7/2010 | Kurokawa et al. | |
| 2010/0193782 A1 * | 8/2010 | Sakata | 257/43 |
| 2010/0259697 A1 * | 10/2010 | Sakamoto et al. | 349/15 |
| 2010/0265230 A1 * | 10/2010 | Kang | 345/211 |

(56) References Cited

U.S. PATENT DOCUMENTS

| | | |
|---|---|---|
| 2010/0328438 A1 | 12/2010 | Ohyama et al. |
| 2011/0051239 A1 | 3/2011 | Daiku |
| 2011/0157696 A1 | 6/2011 | Bennett et al. |
| 2011/0175090 A1 | 7/2011 | Sugihara et al. |
| 2011/0181827 A1* | 7/2011 | Takahashi et al. ............ 349/200 |
| 2011/0228180 A1* | 9/2011 | Lo ...................... H04N 13/0422 349/15 |
| 2011/0242100 A1 | 10/2011 | Yamazaki et al. |
| 2012/0132908 A1 | 5/2012 | Sugihara et al. |
| 2012/0154696 A1 | 6/2012 | Koyama |
| 2012/0206325 A1 | 8/2012 | Yamazaki et al. |
| 2012/0206503 A1 | 8/2012 | Hirakata et al. |

FOREIGN PATENT DOCUMENTS

| | | | |
|---|---|---|---|
| EP | 0257638 A | | 3/1988 |
| EP | 1662808 A | | 5/2006 |
| EP | 1737044 A | | 12/2006 |
| EP | 2226847 A | | 9/2010 |
| JP | 60-198861 A | | 10/1985 |
| JP | 63-210022 A | | 8/1988 |
| JP | 63-210023 A | | 8/1988 |
| JP | 63-210024 A | | 8/1988 |
| JP | 63-215519 A | | 9/1988 |
| JP | 63-239117 A | | 10/1988 |
| JP | 63-265818 A | | 11/1988 |
| JP | 64-046731 A | | 2/1989 |
| JP | 03-039722 A | | 4/1991 |
| JP | 03-119889 A | | 5/1991 |
| JP | 05-251705 A | | 9/1993 |
| JP | 08-036145 A | | 2/1996 |
| JP | 08-264794 A | | 10/1996 |
| JP | 09-101749 A | | 4/1997 |
| JP | 11-505377 | | 5/1999 |
| JP | 2000-044236 A | | 2/2000 |
| JP | 2000-150900 A | | 5/2000 |
| JP | 2001-166259 A | | 6/2001 |
| JP | 2002-076356 A | | 3/2002 |
| JP | 2002-289859 A | | 10/2002 |
| JP | 2003-086000 A | | 3/2003 |
| JP | 2003-086808 A | | 3/2003 |
| JP | 2003-259395 A | | 9/2003 |
| JP | 2004-103957 A | | 4/2004 |
| JP | 2004-273614 A | | 9/2004 |
| JP | 2004-273732 A | | 9/2004 |
| JP | 2004-294914 A | | 10/2004 |
| JP | 2005-092103 | * 4/2005 | ............ G02B 27/22 |
| JP | 2005-092103 A | | 4/2005 |
| JP | 2005-258013 | | 9/2005 |
| JP | 2006-154809 A | | 6/2006 |
| JP | 2006-259191 A | | 9/2006 |
| JP | 2009-122657 A | | 6/2009 |
| JP | 2009-267399 A | | 11/2009 |
| JP | 2010-073881 A | | 4/2010 |
| JP | 2010-128306 A | | 6/2010 |
| JP | 2010-251156 A | | 11/2010 |
| JP | 2011-013778 A | | 1/2011 |
| JP | 2011-053277 A | | 3/2011 |
| KR | 2006-0060102 A | | 6/2006 |
| KR | 10-0786862 B | | 12/2007 |
| TW | I243480 | | 11/2005 |
| WO | WO-2004/114391 | | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IgZo Transparent Amorphous Oxide Semiconductor,", IDW '08: Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) , Jun. 17, 1996, vol. 68, No. 25, pp. 3650-3652.

Nakamura.M et al., "The phase relations in the $In_2O_3$—$Ga_2ZnO_4$—$ZnO$ system at 1350° C.,", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)m$ (m=3, 4, and 5), $InGaO_3(ZnO)_3$, and $Ga_2O_3(ZnO)m$ (m=7, 8, 9, and 16) in the $In_2O_3$—$ZnGa_2O_4$—$ZnO$ System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation with Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)_5$ films,", Appl. Phys. Lett. (Applied Physics Letters) , Sep. 13, 2004, vol. 85, No. 11, pp. 1993-1995.

Li.C et al., "Modulated Structures of Homologous Compounds $InMO_3(ZnO)m$ (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QvGa AMOLED Driven by the Threshold Voltage Controlled Amorphous GIZO ($Ga_2O_3$—$In_2O_3$—$ZnO$) TFT,", SID Digest '08 : SID International Symposium Digest of Technical Papers, May 20, 2008, vol. 39, pp. 633-636.

Lee.J et al., "World's Largest (15-Inch) XgA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MoO_3$ as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

(56) References Cited

OTHER PUBLICATIONS

Jeong.J et al., "3.1: Distinguished Paper: 12.1-Inch WxGa AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn—Oxide TFTs with Suppressed Variation for 4.0 inch QvGa AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.

Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

Godo.H et al., "Temperature Dependence of Characteristics and Electronic Structure For Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", Am-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 In. QvGa AMOLED Display Using In—Ga—Zn—Oxide TFTs With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YbFe2O4, and Yb2Fe3O7 Types of Structures for Compounds in The In2O3 and Sc2O3—A2O3—Bo systems [A; Fe, Ga, or Al; B: Mg, Mn, Fe, Ni, Cu,or Zn] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

(56) References Cited

OTHER PUBLICATIONS

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

Kamiya Toshio; Nomura Kenji; Hosono Hideo, "Carrier transport properties and electronic structures of amorphous oxide semiconductors: the present status" Engineering Application of Solid State Physics, vol. 44, Issue 9, pp. 621-633, published in Japan in 2009.

International Search Report (Application No. PCT/JP2012/053895) Dated Mar. 19, 2012.

Written Opinion (Application No. PCT/JP2012/053895) Dated Mar. 19, 2012.

Official Filing Receipt, Specification, Claims, Abstract and Drawings of U.S. Appl. No. 13/308,601 to Koyama filed Dec. 1, 2011.

Official Filing Receipt, Specification, Claims, Abstract and Drawings of U.S. Appl. No. 13/363,408 to Hirakata et al. filed Feb. 1, 2012.

Official Filing Receipt, Specification, Claims, Abstract and Drawings of U.S. Appl. No. 13/367,711 to Yamazaki et al. filed Feb. 7, 2012.

Official Filing Receipt, Specification, Claims, Abstract and Drawings of U.S. Appl. No. 13/367,715 to Yamazaki et al. filed Feb. 7, 2012.

Taiwanese Office Action (Application No. 101105512) Dated May 17, 2016.

* cited by examiner

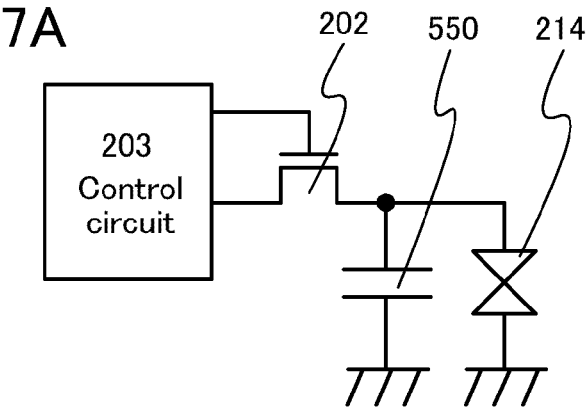
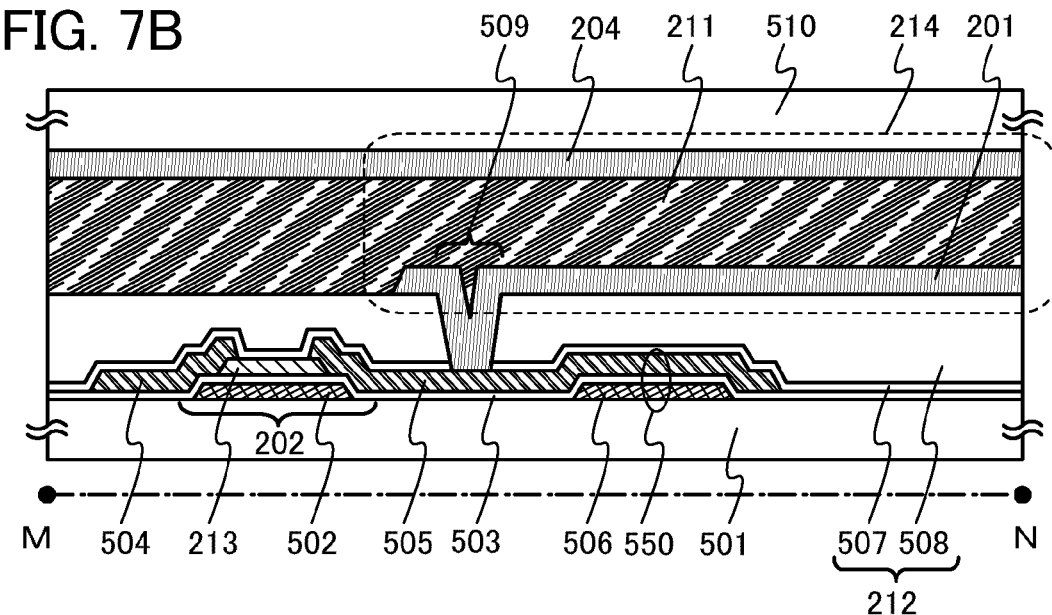
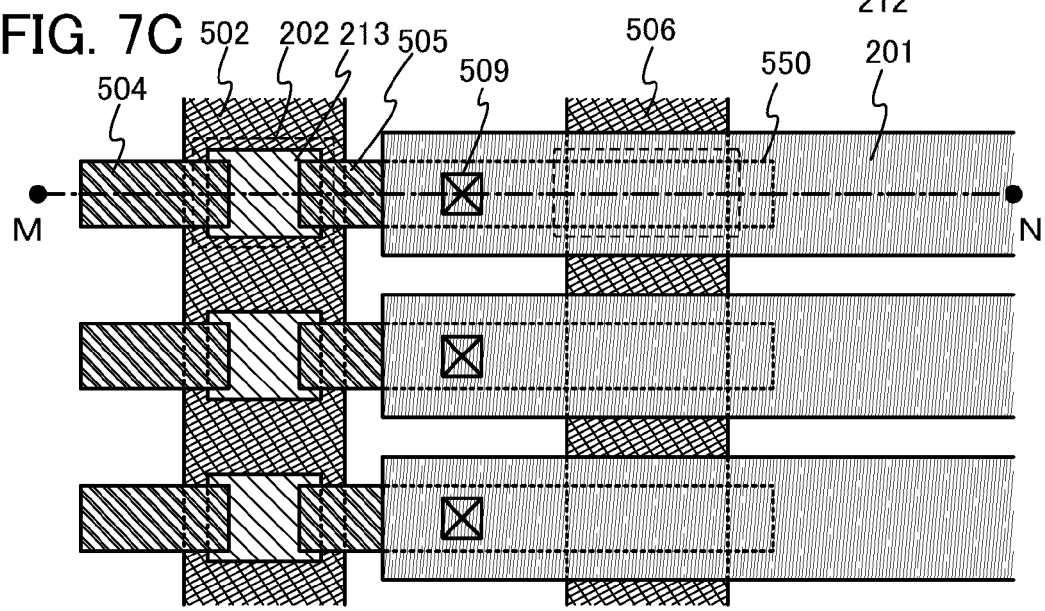

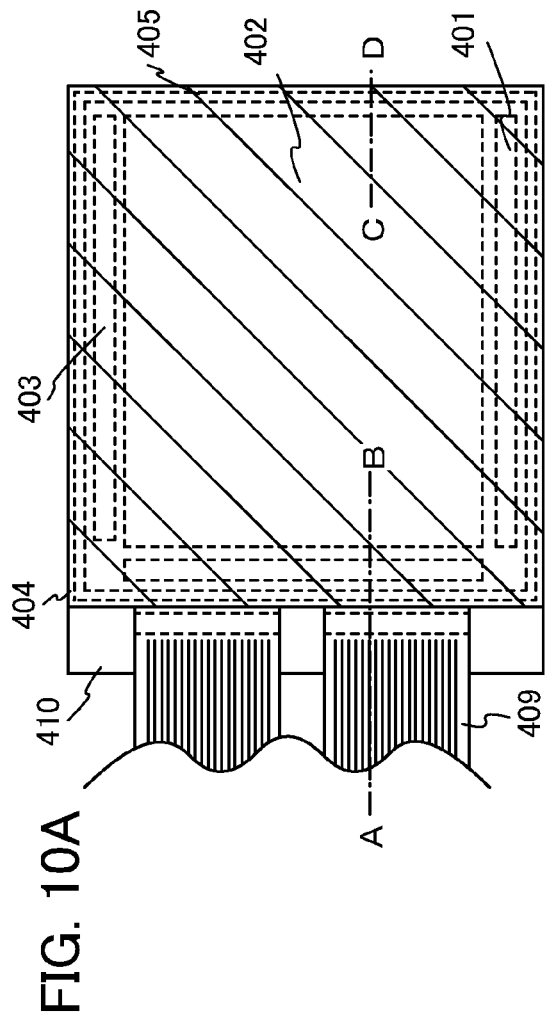
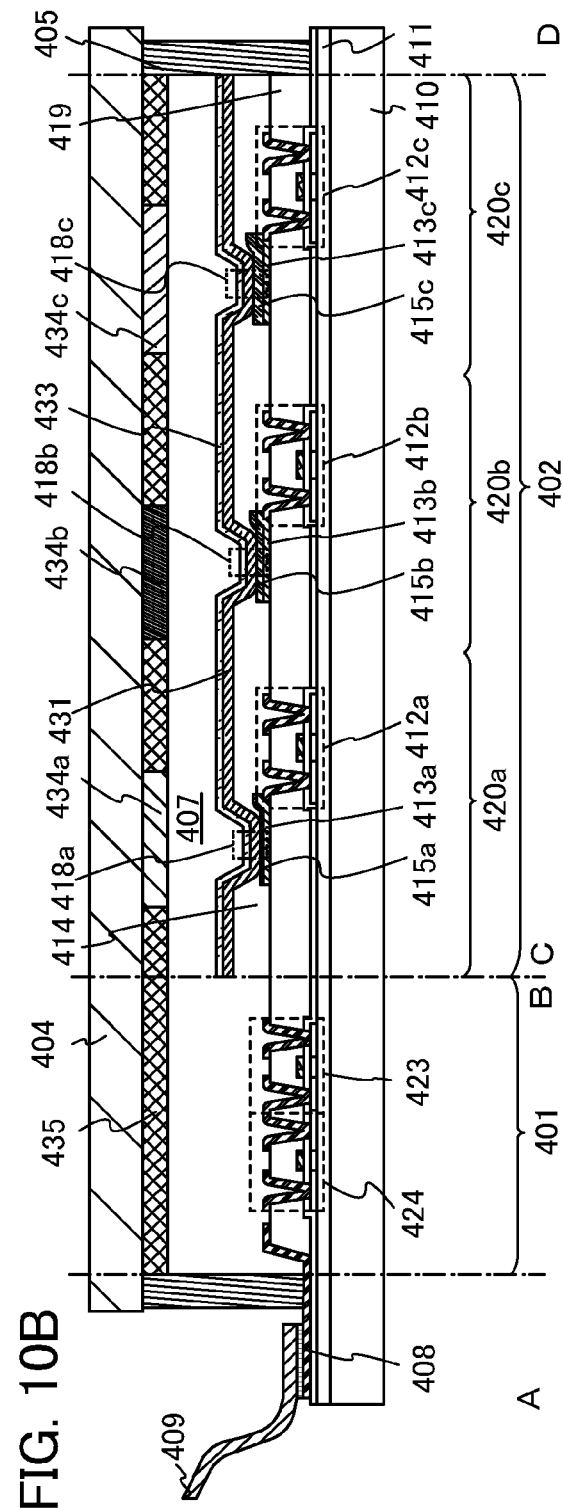

DISPLAY DEVICE HAVING A PLURALITY OF PIXELS

TECHNICAL FIELD

The present invention relates to display devices and particularly relates to a display device capable of displaying three-dimensional (3D) images.

BACKGROUND ART

Display devices are widely used, ranging from large display devices such as television devices to small display devices such as mobile phones. High value-added products will be needed and are being developed. In recent years, display devices that can display 3D images have been developed in order to display more realistic images.

As methods for displaying 3D images, there are a method using glasses for separating an image seen with a left eye and an image seen with a right eye (also referred to as stereoscopy), and autostreoscopy by which 3D images can be seen by the naked eye by addition of a structure for separating an image seen with a left eye and an image seen with a right eye in a display portion. It is not necessary to prepare glasses to see autostereoscopic 3D images, which offers a high convenience. Autostereoscopic 3D display is coming into widespread use such as mobile phones and mobile game consoles.

As a method for displaying autostereoscopic 3D images, there is known a parallax barrier method in which a parallax bather is added to a display portion. A parallax barrier for this method is a stripe-shaped light-shielding portion and causes a decrease in resolution when display is switched from 3D display to 2D display. In view of this, for a parallax barrier method, there is suggested a structure in which a liquid crystal panel having a patterned transparent electrode is used, and when display is switched between 2D display and 3D display, transmission or shielding of light by a liquid crystal layer is controlled by controlling voltage applied to the transparent electrode in order to set the presence or absence of a parallax barrier (see Patent Document 1).

REFERENCE

Patent Document 1: Japanese Published Patent Application No. 2005-258013

DISCLOSURE OF INVENTION

However, in order to display 3D images by a parallax barrier method, a specific distance is needed between a display screen and the eye of a viewer.

In addition, when a parallax barrier is formed using a liquid crystal layer in a parallax barrier method, continuous voltage application from outside is needed in order to maintain the voltage applied to the liquid crystal layer. Thus, power consumption of a display device is increased.

In view of the above, an object of one embodiment of the present invention is to extend the range of distance (between a display screen and the eye of a viewer) with which the viewer can see 3D images with the naked eye and to reduce power consumption.

In one embodiment of the present invention, a parallax barrier in a shutter panel is controlled to be arranged optimally in accordance with the distance between the viewer and a display panel. Specifically, an optimal parallax barrier is formed as appropriate by selectively switching a light-transmitting state and a light-shielding state of a plurality of optical shutter regions and a display element unit of pixels depending on a retention state. The retention state is realized in such a manner that at least one of electrodes between which a liquid crystal layer is sandwiched is connected to a transistor including a semiconductor layer containing an oxide semiconductor and the transistor is turned off.

According to one embodiment of the present invention, a display device includes a display panel including a plurality of pixels arranged in matrix, and a shutter panel. The shutter panel includes a first substrate provided with a first electrode in parallel with a minor axis or a major axis of the display panel, and a transistor connected to the first electrode and including a semiconductor layer containing an oxide semiconductor; a second substrate provided with a second electrode; and a liquid crystal layer sandwiched between the first electrode and the second electrode. An alignment state of liquid crystal molecules in the liquid crystal layer is changed by a first voltage applied to the first electrode and a second voltage applied to the second electrode, to form a plurality of optical shutter regions each of which state is selectively switched between a light-transmitting state and a light-shielding state. The shutter panel has a first retention state in which each of the optical shutter regions is held in a light-transmitting state or a light-shielding state, and a second retention state in which each of the optical shutter regions is held in a light-transmitting state or a light-shielding state in a different manner from the first retention state. In the first retention state and the second retention state, the first voltage is held by turning off the transistor.

According to one embodiment of the present invention, a display device includes a display panel including a plurality of pixels arranged in matrix, and a shutter panel. The shutter panel includes a first substrate provided with a first electrode in parallel with a minor axis or a major axis of the display panel, and a transistor connected to the first electrode and including a semiconductor layer containing an oxide semiconductor; a second substrate one surface of which is provided with a second electrode; and a liquid crystal layer sandwiched between the first electrode and the second electrode. An alignment state of liquid crystal molecules in the liquid crystal layer is changed by a first voltage applied to the first electrode and a second voltage applied to the second electrode, to form a plurality of optical shutter regions each of which state is selectively switched between a light-transmitting state and a light-shielding state. The shutter panel has a first retention state in which each of the optical shutter regions is held in a light-transmitting state or a light-shielding state, and a second retention state in which each of the optical shutter regions is held in a light-transmitting state or a light-shielding state in a different manner from the first retention state. In the first retention state and the second retention state, the first voltage is held by turning off the transistor.

According to one embodiment of the present invention, a display device includes a display panel including a plurality of pixels arranged in matrix, and a shutter panel. The shutter panel includes a first substrate provided with a first electrode in parallel with a major axis of the display panel, and a first transistor connected to the first electrode and including a semiconductor layer containing an oxide semiconductor; a second substrate provided with a second electrode in parallel with a minor axis of the display panel, and a second transistor connected to the second electrode and including a semiconductor layer containing the oxide semiconductor; and a liquid crystal layer sandwiched between the first electrode and the second electrode. An alignment state of liquid crystal molecules in the liquid crystal layer is changed by a first voltage applied to the first electrode and a second voltage applied to the second electrode, to form a plurality of optical shutter regions each of which state is selectively switched between a light-transmitting state and a light-shielding state. The shutter panel has a first retention state in which each of the optical shutter regions is held in a light-transmitting state or a light-shielding state, and a second retention state in which each of the optical shutter regions is held in a light-transmitting state or a light-shielding state in a different manner from the first retention state. In the first retention state and the second retention state, the first voltage and the second voltage are held by turning off the first transistor and the second transistor.

In the display device according to one embodiment of the present invention, it is preferable that the display panel perform display with each of the plurality of pixels functioning as one display element unit in the first retention state, and that the display panel perform display with at least two pixels functioning as the display element unit in the second retention state.

In the display device according to one embodiment of the present invention, it is preferable that the shutter panel be provided in a direction of light emission from the display panel.

In the display device according to one embodiment of the present invention, it is preferable that the first voltage be rewritten in accordance with a distance between the display panel and a viewer.

In the display device according to one embodiment of the present invention, it is preferable that a sensor for measuring a distance between the viewer and the display device be provided, and that a light-transmitting state or a light-shielding state of each of the optical shutter regions be selected in accordance with the distance measured by the sensor, and the first voltage is rewritten.

According to one embodiment of the present invention, the range of distance with which the viewer can see 3D images with the naked eye can be extended, and power consumption can be reduced. Therefore, a highly convenient display device can be provided.

BRIEF DESCRIPTION OF DRAWINGS

In the accompanying drawings:

FIGS. 7A to 7C illustrate a specific structure of a shatter panel;

FIGS. 10A and 10B illustrate one embodiment of a display panel;

BEST MODE FOR CARRYING OUT THE INVENTION

Figure 1A:
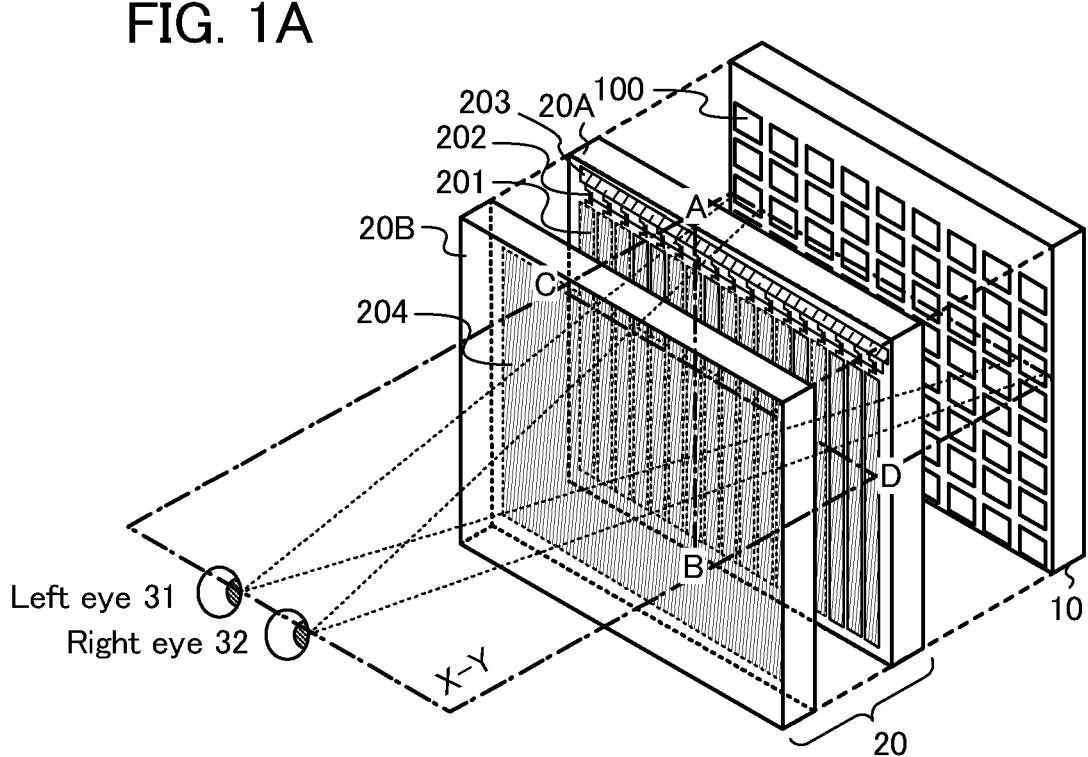
FIGS. 1A to 1C are schematic diagrams of a display device.

Embodiments of the present invention will be hereinafter described with reference to the accompanying drawings. Note that the present invention can be carried out in many different modes, and it is easily understood by those skilled in the art that modes and details of the present invention can be modified in various ways without departing from the spirit and scope of the present invention. Therefore, the present invention should not be construed as being limited to the following description of the embodiments. Note that in structures of the present invention described below, reference numerals denoting the same portions are used in common in different drawings.

Note that the size, the thickness of a layer, signal waveform, and a region in structures illustrated in the drawings and the like in the embodiments are exaggerated for simplicity in some cases. Therefore, the scale is not necessarily limited to that illustrated in the drawings and the like.

Note that in this specification and the like, the terms "first", "second", "third", and "N-th" (N is a natural number) are used in order to avoid confusion between components and thus do not limit the number of the components. The natural number is 1 or more unless otherwise specified.

Embodiment 1

First, a display device according to one embodiment of the present invention will be described with reference to FIGS. 1A to 1C, FIGS. 2A to 2C, FIGS. 3A and 3B, FIGS. 4A to 4C, FIGS. 5A and 5B, and FIGS. 6A and 6B.

FIG. 1A is a schematic diagram illustrating a display device according to one embodiment of the present invention. The display device illustrated in FIG. 1A includes a display panel 10 and a shutter panel 20. FIG. 1A also illustrates a left eye 31 and a right eye 32 of a viewer in order to show a state of the viewer's perception. Light from the display panel 10 is perceived by the left eye 31 and the right eye 32 of the viewer through the shutter panel 20 provided to overlap the display panel 10. The formation of a parallax barrier in the shutter panel 20 at the time when the viewer looks at the display panel 10 generates binocular parallax between the left eye 31 and the right eye 32 of the viewer and thus can make the viewer perceive 3D display.

The display panel 10 illustrated in FIG. 1A includes a plurality of pixels 100 arranged in matrix. For example, the display panel 10 is a liquid crystal display panel including a liquid crystal element in the pixel 100 or an EL display panel including an EL element in the pixel 100.

Note that a pixel corresponds to a display element unit obtained by combining a plurality of sub-pixels that are elements whose brightness can be controlled. A plurality of sub-pixels form a display element unit where the brightness of color elements of red (R), green (G), and blue (B), a combination for displaying color images, can be controlled. Note that the colors of the color elements for displaying color images are not limited to three colors of RGB, and may be more than three colors or may include a color other than red, green, and blue.

The shutter panel 20 illustrated in FIG. 1A is provided in the direction of light emission from the display panel 10, that is, on the same side as the left eye 31 and the right eye 32 of the viewer. The shutter panel 20 includes a first substrate 20A, a second substrate 20B, and a liquid crystal layer (not shown) sandwiched between the first substrate 20A and the second substrate 20B.

The first substrate 20A is provided with first electrodes 201 arranged in a stripe pattern, transistors 202 each having a source and a drain one of which is connected to one of the first electrodes 201, and a control circuit 203 that controls a conduction state and a non-conduction state of the transistors 202.

The second substrate 20B has a second electrode 204 provided on one surface.

The first substrate 20A is a substrate where the first electrodes 201 and the transistors 202 can be formed and has light-transmitting properties. The second substrate 20B is a substrate where the second electrode 204 can be formed and has light-transmitting properties. Examples of the first substrate 20A and the second substrate 20B are a glass substrate and a quartz substrate.

The first electrode 201 and the second electrode 204 are formed using a light-transmitting conductive material. An example of the material for the first electrode 201 and the second electrode 204 is an indium oxide-tin oxide alloy ($In_2O_3$—$SnO_2$, referred to as ITO).

The control circuit 203 is provided over the first substrate 20A in this embodiment; however, it is not always necessarily provided over the first substrate 20A. Moreover, the control circuit 203 can be provided over the first substrate 20A by being formed using transistors.

The first electrodes 201 arranged in a stripe pattern are provided in parallel with the minor axis or the major axis of the display panel 10. The minor axis direction and the major axis direction of the display panel 10 are specifically a vertical direction and a horizontal direction of the matrix of the pixels 100 in the display panel 10. Note that the first electrodes 201 arranged in a stripe pattern can be extended in the diagonal direction of the matrix of the pixels 100 in the display panel 10, or the first electrodes 201 can be arranged in a zigzag (sawtooth) pattern and provided in the vertical direction or the horizontal direction.

The transistor 202 is a transistor including a semiconductor layer containing an oxide semiconductor. As the oxide semiconductor, an intrinsic (i-type) or substantially intrinsic semiconductor in which the number of carriers is very small and the carrier concentration is less than $1\times10^{14}/cm^3$, preferably less than $1\times10^{12}/cm^3$, further preferably less than $1\times10^{11}/cm^3$ is used.

The off-state current per micrometer of channel width of the transistor containing the above oxide semiconductor in its channel formation region can be 100 yA ($1\times10^{-22}$ A) or less, preferably 10 yA ($1\times10^{-23}$ A) or less, further preferably 1 yA ($1\times10^{-24}$ A) or less.

Note that in this specification, the off-state current is a current that flows between a source and a drain when a transistor is off. In an n-channel transistor (e.g., with a threshold voltage of about 0 to 2 V), the off-state current means a current that flows between a source and a drain when a negative voltage is applied between a gate and the source.

In the following description, an oxide semiconductor having the above-described advantages is used as the semiconductor material for the semiconductor layer in the transistor 202 as an example. In the drawings, a circuit symbol representing a transistor in which an oxide semiconductor is used for its channel formation region is sometimes labeled with "OS" for clarity.

The control circuit 203 that controls a conduction state and a non-conduction state of the transistor 202 is connected to a gate and the other of the source and the drain of the transistor 202 and controls a first voltage supplied to the first electrode 201. Specifically, the control circuit 203 performs control in such a manner that the first voltage to be held in the first electrode 201 is supplied by turning on the transistor 202 or the first voltage is held in the first electrode 201 by turning off the transistor 202.

The second electrode 204 provided on one surface of the second substrate 20B is provided so as to face the first electrodes 201 of the first substrate 20A with the liquid crystal layer placed therebetween. The expression "the second electrode 204 provided on one surface" means that the second electrode 204 is provided on one surface with respect to the surface where the first electrodes 201 are provided, and does not mean that the second electrode 204 is provided on the entire surface of one surface of the second substrate 20B. The second electrode 204 is supplied with a second voltage serving as a reference voltage for controlling alignment of liquid crystal molecules in the liquid crystal layer.

The first voltage is a voltage capable of controlling alignment of liquid crystal molecules in the liquid crystal layer with the second voltage of the second electrode 204 so that the liquid crystal layer can be in a light-transmitting state or a light-shielding state. Accordingly, the voltage needs to be adjusted as appropriate in accordance with a liquid crystal material used for the liquid crystal layer. Note that 2D images can be displayed without reduction in the resolution when the entire shutter panel 20 is brought into a light-transmitting state by using the liquid crystal layer, whereas 3D images can be displayed when a light-shielding region is formed in the shutter panel 20 as appropriate by the liquid crystal layer to serve as a parallax barrier.

Figure 1B:
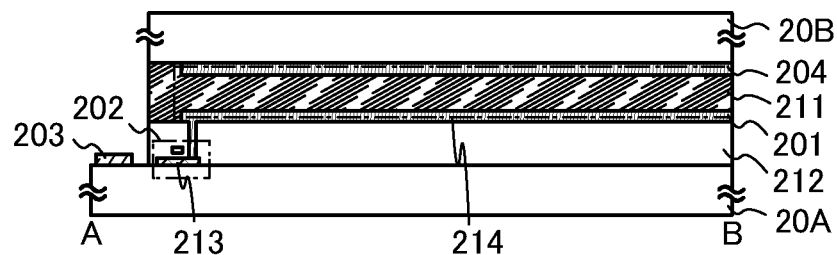

FIG. 1B is a simplified cross-sectional view along dashed line A-B of the shutter panel 20 in FIG. 1A. In the cross-sectional view in FIG. 1B, the transistor 202 and the control circuit 203 are provided over the first substrate 20A. An insulating layer 212 is provided over the transistor 202. The top surface of the insulating layer 212 is planarized, and the first electrode 201 connected to one of the source and the drain of the transistor 202 is provided. Further, the second electrode 204 is provided on one surface of the second substrate 20B. As described above, a liquid crystal layer 211 is sandwiched between the first electrode 201 and the second electrode 204, and alignment of liquid crystal molecules in the liquid crystal layer is controlled by controlling the first voltage applied to the first electrode 201 and the second voltage applied to the second electrode 204; thus, a light-transmitting state or a light-shielding state can be controlled.

Figure 1C:
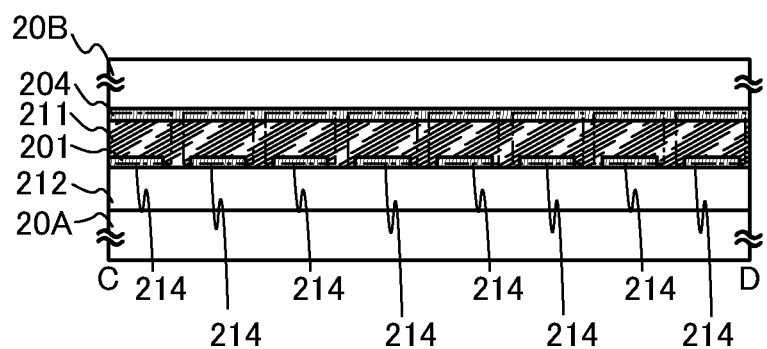

FIG. 1C is a simplified cross-sectional view along dashed line C-D of the shutter panel 20 in FIG. 1A. In the cross-sectional view in FIG. 1C, the insulating layer 212 is provided over the first substrate 20A. The top surface of the insulating layer 212 is planarized, and the stripe-shaped first electrodes 201 are provided. Further, the second electrode 204 is provided on one surface of the second substrate 20B. As described above, the liquid crystal layer 211 is sandwiched between the first electrodes 201 and the second electrode 204, and alignment of liquid crystal molecules in the liquid crystal layer is controlled by controlling the first voltage applied to the first electrode 201 and the second voltage applied to the second electrode 204; thus, a light-transmitting state or a light-shielding state can be controlled.

As described above, a semiconductor layer 213 of the transistor 202 contains an oxide semiconductor; consequently, the transistor 202 can be a transistor with extremely low off-state current. Therefore, the first voltage once supplied to the first electrode 201 can be held by turning off the transistor 202. Thus, alignment of liquid crystal molecules in the liquid crystal layer 211 can be held by the first electrodes 201 and the second electrode 204 without repeated supply of the first voltage to the first electrodes 201, so that power consumption can be reduced.

The liquid crystal layer 211, which is illustrated in FIGS. 1B and 1C and sandwiched between the first electrodes 201 and the second electrode 204, forms an optical shutter region 214. Although FIG. 1B shows only one optical shutter region 214, regions where the liquid crystal layer 211 is sandwiched between the first electrodes 201 and the second electrode 204 are corresponding regions in the shutter panel 20 as illustrated in FIG. 1C, which means that there are a plurality of optical shutter regions 214. In the shutter panel 20, a plurality of optical shutter regions 214 arranged in a stripe pattern are formed in accordance with the shape of the first electrodes 201 arranged in a stripe pattern.

The optical shutter region 214 can function as a parallax barrier in a parallax barrier method for displaying 3D images. In the optical shutter region 214 in this embodiment, a light-transmitting state or a light-shielding state of the liquid crystal layer 211 is determined by setting an applied voltage as appropriate, and a light-shielding region formed using the optical shutter region 214 serving as a parallax barrier can be formed in a desired position. Specifically, for example, in a first retention state where the distance between the viewer and the display device is a first distance, a parallax barrier with which 3D images can be displayed is formed by the optical shutter region; in a second retention state where the distance between the viewer and the display device is a second distance, the optical shutter region is set in a condition different from that in the first retention state to form a parallax barrier with which 3D images can be displayed. That is, a light-transmitting state and a light-shielding state of a plurality of optical shutter regions are controlled in accordance with the distance between the viewer and the display device, whereby a parallax barrier formed using the optical shutter regions 214 can be formed in a desired position. In other words, in the shutter panel 20 including the optical shutter regions 214 described in this embodiment, the pattern of a parallax barrier can vary according to a state of the viewer's perception. As a result, the structure in this embodiment can extend the range of distance with which the viewer can see 3D images with the naked eye.

Note that the width of the first electrode 201 described in this embodiment (the length of the stripe-shaped first electrode 201 in the minor axis direction) is preferably set smaller than the pitch of the pixel 100 which is the repeating unit. In the case of the optical shutter region designed in the above manner in this embodiment, the width of the optical shutter region serving as a parallax barrier can be easily adjusted.

Although not shown in FIGS. 1B and 1C, a polarizing plate is provided on a surface of the first substrate 20A on the side where the first electrodes 201 are not provided, and on a surface of the second substrate 20B on the side where the second electrode 204 is not provided.

Figure 2A:
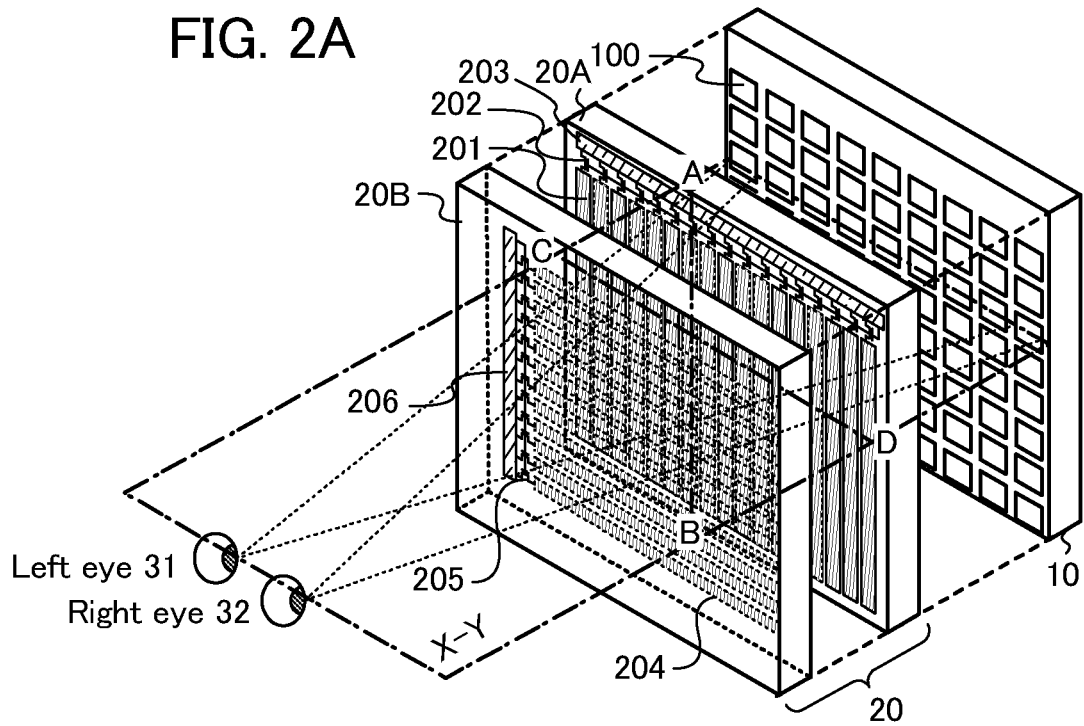
FIGS. 2A to 2C are schematic diagrams of a display device.
Figure 2B:
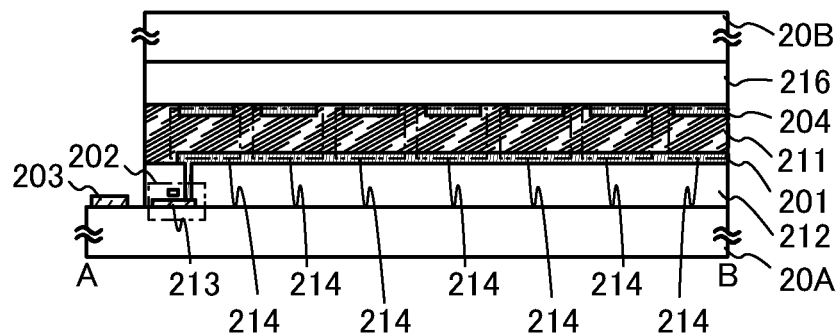
Figure 2C:
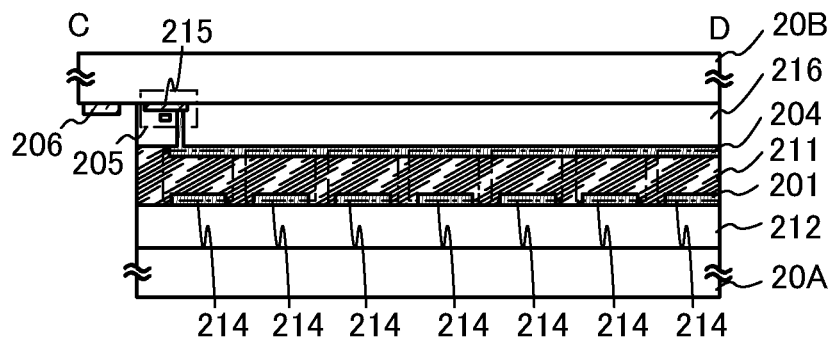

Next, FIGS. 2A to 2C illustrate a structure different from that in FIGS. 1A to 1C. The structure in FIGS. 2A to 2C differs from the structure in FIGS. 1A to 1C in that the second electrode 204 has a different shape and that a transistor 205 and a control circuit 206 for controlling the transistor 205 are provided on the second substrate 20B.

Like FIG. 1A, FIG. 2A is a schematic diagram illustrating a display device in one embodiment of the present invention. The second substrate 20B is provided with a plurality of second electrodes 204 arranged in a stripe pattern, the transistor 205 having a source and a drain one of which is connected to the second electrode 204, and the control circuit 206 that controls a conduction state and a non-conduction state of the transistor 205.

Like the transistor 202, the transistor 205 is a transistor including a semiconductor layer containing an oxide semiconductor. Therefore, the off-state current per micrometer of channel width of the transistor can be 100 yA ($1\times10^{-22}$ A) or less, preferably 10 yA ($1\times10^{-23}$ A) or less, further preferably 1 yA ($1\times10^{-24}$ A) or less.

The control circuit 206 is provided on the second substrate 20B in this embodiment; however, it is not always necessary to be provided on the second substrate 20B. Moreover, the control circuit 206 can be formed on the second substrate 20B by being formed using transistors.

The control circuit 206 that controls a conduction state and a non-conduction state of the transistor 205 is connected to a gate and the other of the source and the drain of the transistor 205 and controls the second voltage supplied to the second electrode 204. Specifically, the control circuit 206 performs control in such a manner that the second voltage to be held in the second electrode 204 is supplied by turning on the transistor 205 or the second voltage is held in the second electrode 204 by turning off the transistor 205.

The second electrodes 204 arranged in a stripe pattern are provided in parallel with the minor axis or the major axis of the display panel 10 and provided so as to perpendicularly face the first electrodes 201 on the first substrate 20A with the liquid crystal layer placed therebetween. The second electrode 204 is supplied with the second voltage serving as a reference voltage for controlling alignment of liquid crystal molecules in the liquid crystal layer. Note that 2D images can be displayed without reduction in the resolution when the entire shutter panel 20 is brought into a light-transmitting state by using the liquid crystal layer, whereas 3D images can be displayed when a light-shielding region is formed in the shutter panel 20 as appropriate by the liquid crystal layer to serve as a parallax barrier.

FIG. 2B is a simplified cross-sectional view along dashed line A-B of the shutter panel 20 in FIG. 2A. In the cross-sectional view in FIG. 2B, the transistor 202 and the control circuit 203 are provided over the first substrate 20A. The insulating layer 212 is provided over the transistor 202. The top surface of the insulating layer 212 is planarized, and the first electrode 201 connected to one of the source and the drain of the transistor 202 is provided. Moreover, in the cross-sectional view in FIG. 2B, an insulating layer 216 is provided on the second substrate 20B. The top surface of the insulating layer 216 is planarized, and the stripe-shaped second electrodes 204 are provided. As described above, the liquid crystal layer 211 is sandwiched between the first electrodes 201 and the second electrode 204, and alignment of liquid crystal molecules in the liquid crystal layer 211 is controlled by controlling the first voltage applied to the first electrode 201 and the second voltage applied to the second electrode 204; thus, a light-transmitting state or a light-shielding state can be controlled.

FIG. 2C is a simplified cross-sectional view along dashed line C-D of the shutter panel 20 in FIG. 2A. In the cross-sectional view in FIG. 2C, the insulating layer 212 is provided over the first substrate 20A. The top surface of the insulating layer 212 is planarized, and the stripe-shaped first electrodes 201 are provided. Moreover, in the cross-sectional view in FIG. 2C, the transistor 205 and the control circuit 206 are provided on the second substrate 20B. The insulating layer 216 is provided on the transistor 205. The top surface of the insulating layer 216 is planarized, and the second electrode 204 connected to one of the source and the drain of the transistor 205 is provided. As described above, the liquid crystal layer 211 is sandwiched between the first electrodes 201 and the second electrode 204, and alignment of liquid crystal molecules in the liquid crystal layer is controlled by controlling the first voltage applied to the first electrode 201 and the second voltage applied to the second electrode 204; thus, a light-transmitting state or a light-shielding state can be controlled.

As described above, the semiconductor layer 213 of the transistor 202 contains an oxide semiconductor; consequently, the transistor 202 can be a transistor with extremely low off-state current. Therefore, the first voltage once supplied to the first electrode 201 can be held by turning off the transistor 202. In addition, a semiconductor layer 215 of the transistor 205 contains an oxide semiconductor as described above; consequently, the transistor 205 can be a transistor with extremely low off-state current. Therefore, the second voltage once supplied to the second electrode 204 can be held by turning off the transistor 205. Thus, alignment of liquid crystal molecules in the liquid crystal layer 211 can be held by the first electrodes 201 and the second electrode 204 without repeated supply of the first voltage to the first electrodes 201 and repeated supply of the second voltage to the second electrode 204, and power consumption can be reduced as a result.

The liquid crystal layer 211, which is illustrated in FIGS. 2B and 2C and sandwiched between the first electrodes 201 and the second electrode 204, forms the optical shutter region 214. As illustrated in FIGS. 2B and 2C, the optical shutter regions 214 correspond to regions where the liquid crystal layer 211 is sandwiched between the first electrodes 201 and the second electrode 204 in the shutter panel 20, which means that there are a plurality of optical shutter regions 214. In the shutter panel 20, a plurality of optical shutter regions are formed in regions where the stripe-shaped first electrodes 201 overlap with the stripe-shaped second electrodes 204.

The optical shutter region 214 can function as a parallax barrier in a parallax barrier method for displaying 3D images. In the optical shutter region 214 in this embodiment, a light-transmitting state or a light-shielding state of the liquid crystal layer 211 is determined by setting an applied voltage as appropriate, and a light-shielding region formed using the optical shutter region 214 serving as a parallax barrier can be formed in a desired position. Specifically, for example, in a first retention state where the distance between the viewer and the display device is a first distance, a parallax barrier with which 3D images can be displayed is formed by the optical shutter region; in a second retention state where the distance between the viewer and the display device is a second distance, the optical shutter region is set in a condition different from that in the first retention state to form a parallax barrier with which 3D images can be displayed. That is, a light-transmitting state and a light-shielding state of a plurality of optical shutter regions are controlled in accordance with the distance between the viewer and the display device, whereby a parallax barrier formed using the optical shutter regions 214 can be formed in a desired position. In other words, in the shutter panel 20 including the optical shutter regions 214 described in this embodiment, the pattern of a parallax barrier can vary according to a state of the viewer's perception. As a result, the structure in this embodiment can extend the range of distance with which the viewer can see 3D images with the naked eye.

Note that the width of the second electrode 204 described in this embodiment (the length of the stripe-shaped second electrode 204 in the minor axis direction) is preferably set smaller than the pitch of the pixel 100 which is the repeating unit. The width of the optical shutter region described in this embodiment which is designed in the above manner and serves as a parallax barrier can be easily adjusted.

Although not illustrated in FIGS. 2B and 2C, a polarizing plate is provided on a surface of the first substrate 20A on the side where the first electrodes 201 are not provided, and on a surface of the second substrate 20B on the side where the second electrodes 204 are not provided.

With the structures in FIGS. 1A to 1C and FIGS. 2A to 2C, patterns of the optical shutter regions can vary, and the range in which 3D images can be displayed can be extended. Next, a description will be given using FIGS. 3A and 3B and FIGS. 4A to 4C of an example of the operation of the display panel for extending the range in which 3D images can be displayed, at the time when the distance between the viewer and the display device is changed. That is, a description will be given of an example where the range in which 3D images can be displayed is extended by adjustment of a light-shielding state of the stripe-shaped optical shutter regions and adjustment of the display element unit.

Figure 3A:
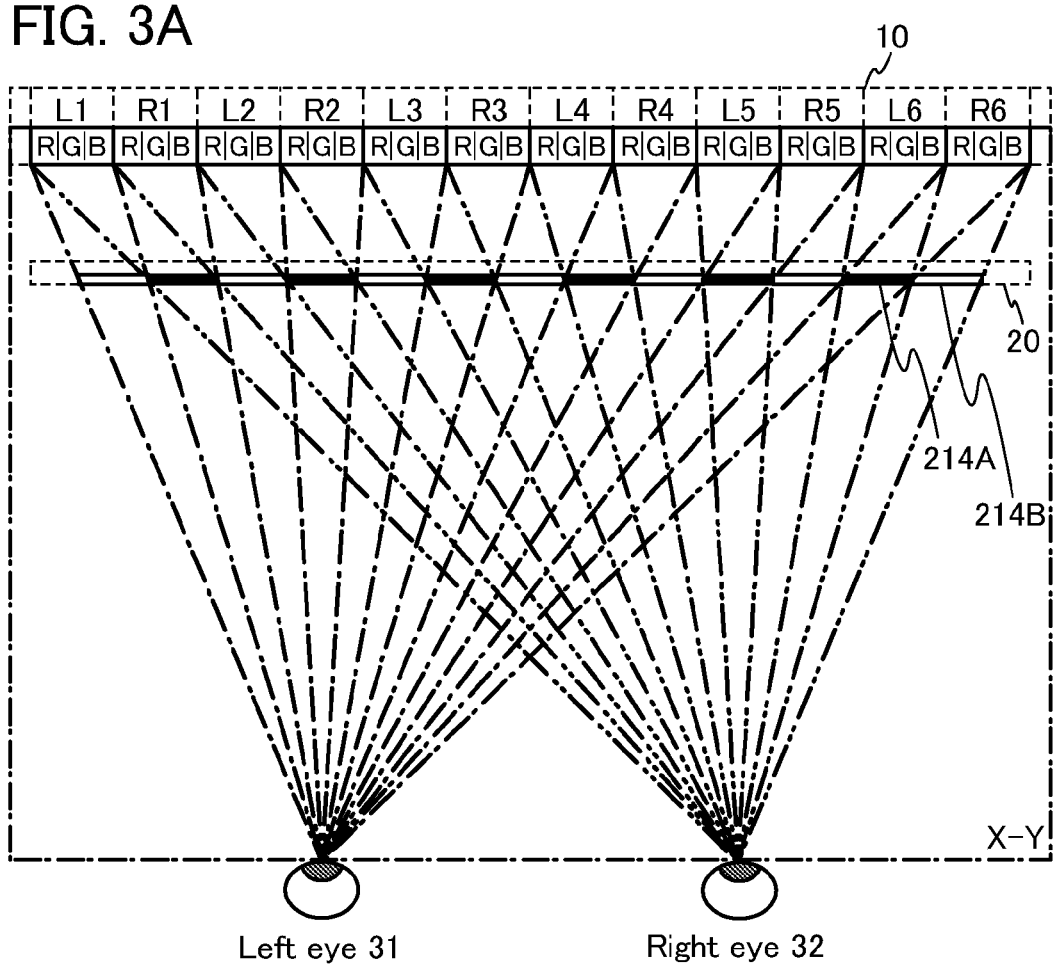
FIGS. 3A and 3B are schematic diagrams illustrating the relation between a display device and a viewer.

FIG. 3A is a schematic diagram illustrating a structure of the section X-Y of the display device in FIG. 1A. In the display panel 10 according to this embodiment, right eye 3D displays (R1 to R6) can be performed in pixels adjacent to pixels where left eye 3D displays (L1 to L6) are performed with each pixel functioning as the display element unit. Each of the pixels where the right eye 3D display (R1 to R6) or the left eye 3D display (L1 to L6) is performed includes a sub-pixel (R) for expressing red, a sub-pixel (G) for expressing green, and a sub-pixel (B) for expressing blue. In addition, the shutter panel 20 according to this embodiment can be controlled so that the left eye 31 perceives only the pixels where the left eye 3D displays (L1 to L6) are performed, and the right eye 32 perceives only the pixels where the right eye 3D displays (R1 to R6) are performed. Specifically, optical shutter regions positioned between the left eye 31 and the pixels where the right eye 3D displays (R1 to R6) are performed and optical shutter regions positioned between the right eye 32 and the pixels where the left eye 3D displays (L1 to L6) are performed are brought into a light-shielding state (black portions 214A in FIG. 3A), and the other regions are brought into a light-transmitting state (white portions 214B in FIG. 3A).

Thus, binocular parallax can be generated for the viewer. Therefore, 3D images can be displayed in the display device according to one embodiment of the present invention.

Further, in the display device according to this embodiment, 3D images can be viewed by the viewer even with the condition in which the distance between the viewer and the display device is different from that in the condition shown in FIG. 3A.

Figure 3B:
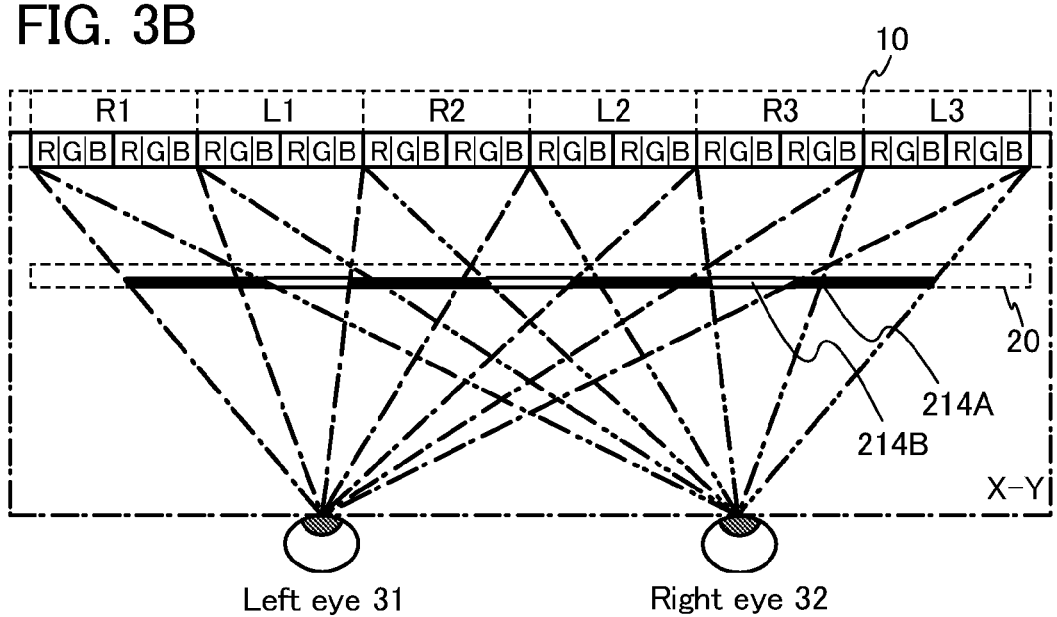

FIG. 3B is a schematic diagram illustrating the structure of the display device according to this embodiment in the case where the distance between the viewer and the display device is smaller than that shown in FIG. 3A. In the display panel 10 according to this embodiment, right eye 3D displays (R1 to R3) can be performed in pixels adjacent to pixels where left eye 3D displays (L1 to L3) are performed with two pixels functioning as the display element unit. Specifically, two pixels can serve as a display element unit by supplying a common image signal to two sub-pixels that are included in the two pixels and express the same color (one of red, green, and blue). In addition, the shutter panel 20 according to this embodiment can be controlled so that the left eye 31 perceives only the pixels where the left eye 3D displays (L1 to L3) are performed, and the right eye 32 perceives only the pixels where the right eye 3D displays (R1 to R3) are performed. Specifically, optical shutter regions positioned between the left eye 31 and the pixels where the right eye 3D displays (R1 to R3) are performed and optical shutter regions positioned between the right eye 32 and the pixels where the left eye 3D displays (L1 to L3) are performed are brought into a light-shielding state (the black portions 214A in FIG. 3B), and the other regions are brought into a light-transmitting state (the white portions 214B in FIG. 3B).

Thus, binocular parallax can be generated for the viewer. Therefore, in the display device according to one embodiment of the present invention, 3D images can be displayed under two conditions in FIGS. 3A and 3B with different distances between the viewer and the display device. In other words, the range in which 3D images can be displayed can be extended by adjusting a light-shielding state of the stripe-shaped optical shutter regions in the shutter panel 20 and adjusting the display element unit in the display panel 10.

Each of a plurality of light-shielding regions (a plurality of black portions 214A in FIGS. 3A and 3B) formed in the shutter panel 20 under the conditions shown in FIGS. 3A and 3B includes one or a plurality of optical shutter regions. That is, the barrier is not limited to being constituted by one optical shutter region.

FIGS. 3A and 3B illustrate the pixel composed of RGB sub-pixels; however, the structure of the pixel is not limited to this. In other words, the pixel can be composed of a combination of three sub-pixels each expressing a different color. Moreover, the pixel can be composed of a combination of four or more sub-pixels each expressing a different color (e.g., R, G, B, and Y (a sub-pixel for expressing yellow).

FIG. 3B shows the structure in which all of six sub-pixels included in each display element unit performing the left eye 3D display (L1 to L3) or the right eye 3D display (R1 to R3) express one of red, green, and blue; alternatively, one to three sub-pixels among the six sub-pixels can express black (K). For example, it is possible to employ a structure (see FIG. 4A) in which three sub-pixels included in one of two pixels of the display element unit express one of red, green, and blue and the sub-pixels included in the other pixel express black (K). In addition, it is possible to employ a structure (see FIG. 4B) in which arrangement of sub-pixels included in two pixels of the display element unit varies between display element units. Further, it is possible to employ a structure (see FIG. 4C) in which four sub-pixels among six sub-pixels included in two pixels of the display element unit express one of red, green, and blue and the other two sub-pixels express black (K). In the structure illustrated in FIG. 4C, only one given color is expressed by two sub-pixels, and the other two colors are each expressed by one sub-pixel. In that case, it is preferable to adjust image signals input to sub-pixels so that the luminance of three colors is uniform.

Figure 4A:
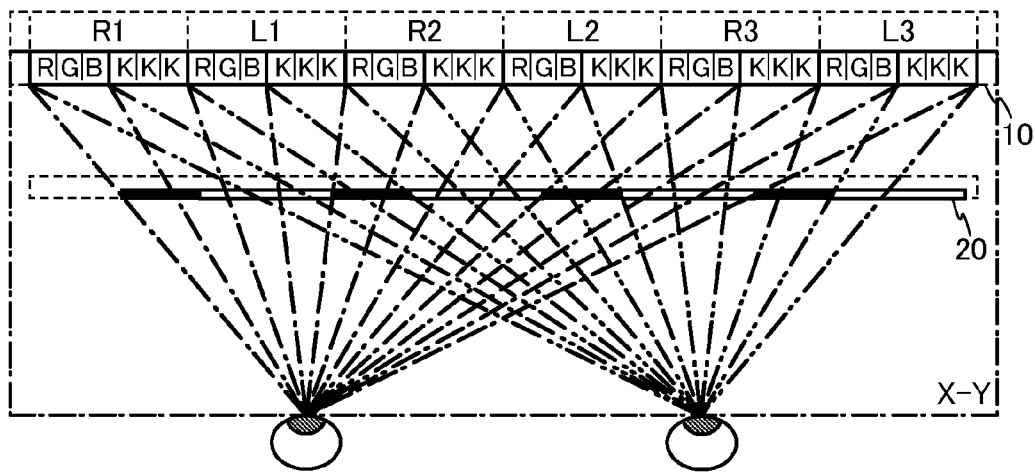
FIGS. 4A to 4C are schematic diagrams illustrating the relation between a display device and a viewer.
Figure 4B:
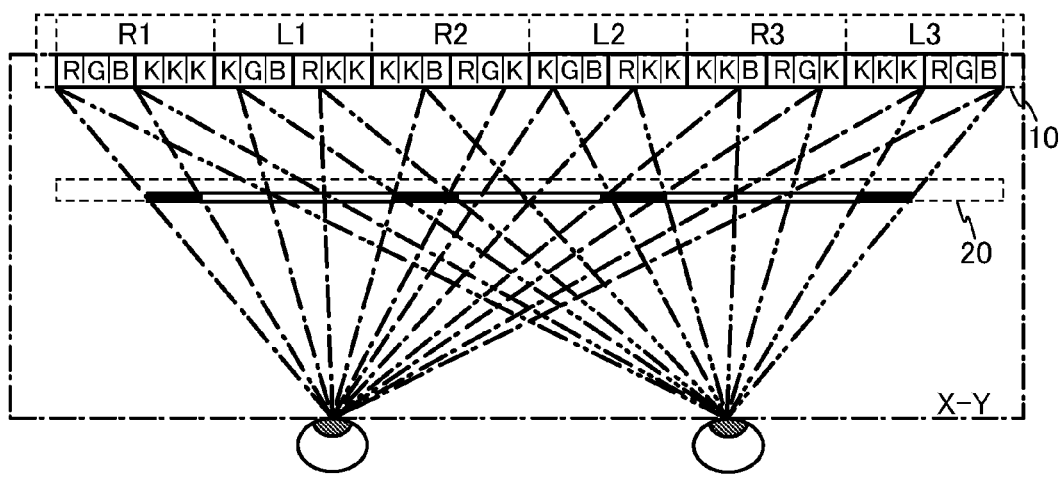
Figure 4C:
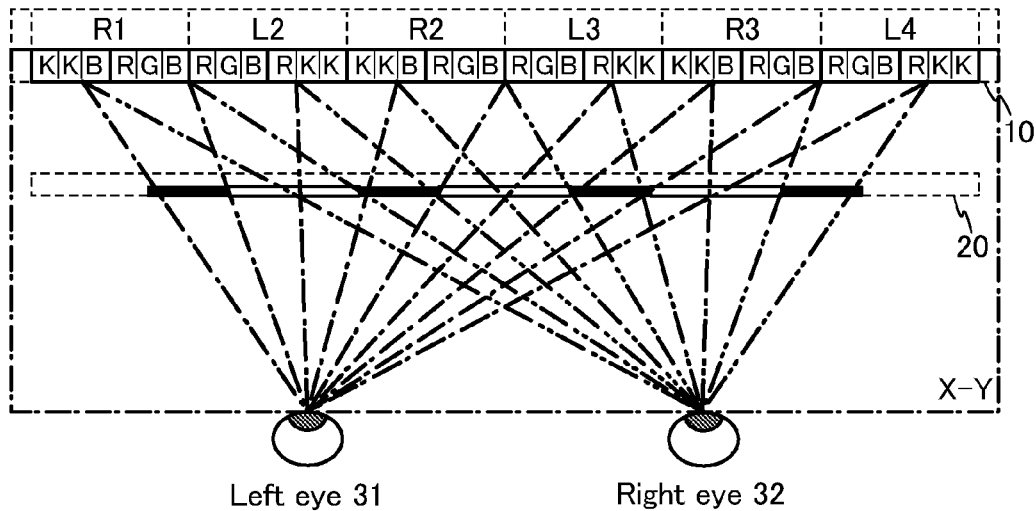

In the case where the display device has a structure in which light emission of a light-emitting element is controlled in each sub-pixel (e.g., the display device uses organic electroluminescence), power consumption can be reduced by performing partial black display (K) as shown in FIGS. 4A to 4C.

Although the position of a parallax barrier provided in the shutter panel in FIG. 3B and FIGS. 4A to 4C is different from that in FIG. 3A, 3D images can be displayed in any of these cases. That is, in any of the conditions in FIG. 3B and FIGS. 4A to 4C, the range in which 3D images can be displayed can be extended by adjusting a light-shielding state of the stripe-shaped optical shutter regions in the shutter panel 20 and adjusting the display element unit in the display panel 10.

FIG. 3B and FIGS. 4A to 4C each show the structure in which the display element unit has two pixels; alternatively, the display element unit can have three or more pixels.

Figure 5A:
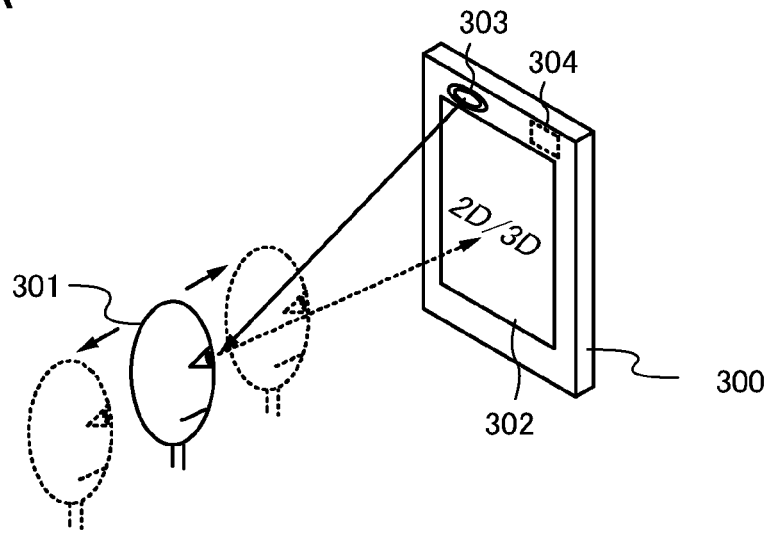
FIG. 5A is a diagram illustrating an application example of a display device.

Next, FIG. 5A is a schematic diagram illustrating an application example of the above-described display device in this embodiment, used by the viewer.

FIG. 5A shows a display device 300 and a viewer 301. The display device 300 includes a distance sensor 303 and an angular sensor 304 in addition to a display portion 302 including the above-described display panel and shutter panel. The distance sensor 303 and the angular sensor 304 are provided as means for measuring the distance between the display device 300 and the viewer 301, and shown as one structure example for measuring the distance.

The distance sensor 303 and the angular sensor 304, which are the measurement means, measure the distance between the display device 300 and the viewer 301. The distance between the display device 300 and the viewer 301 is preferably measured with high accuracy, for example, by a combination of distance detection by the distance sensor 303 such as an infrared sensor and angular detection by the angular sensor 304 such as a gyro sensor. In the display device 300, the width of the parallax barrier formed using the optical shutter regions 214 in the shutter panel 20 is variable in accordance with the aforementioned distance. In other words, the display device in this embodiment can make the viewer perceive 3D display by generating binocular parallax between the left eye and the right eye of the viewer even if the viewer 301 looks at the display portion 302 without fixing the distance with the display device 300.

Figure 5B:
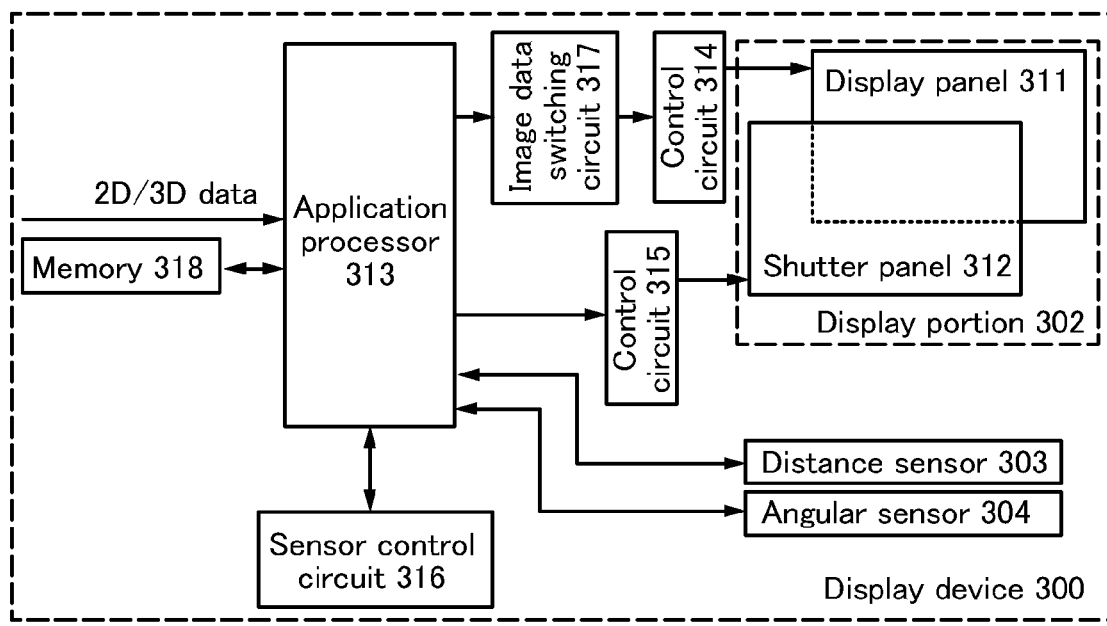
FIG. 5B is a block diagram of the display device.

FIG. 5B is a block diagram of the display device 300 including the distance sensor 303 and the angular sensor 304 described with reference to FIG. 5A. The display device 300 illustrated in FIG. 5B includes a display panel 311, a shutter panel 312, an application processor 313, a display panel control circuit 314, a shutter panel control circuit 315, a sensor control circuit 316, an image data switching circuit 317, and a memory 318 in addition to the display portion 302, the distance sensor 303, and the angular sensor 304 described in FIG. 5A.

The display panel 311 and the shutter panel 312 included in the display portion 302 are the display panel and the shutter panel described using FIGS. 1A to 1C or FIGS. 2A to 2C, which means that 3D images can be displayed even when the distance between the display device and the viewer is changed. In addition, in the display device in FIG. 5B, 2D display and 3D display in the display portion 302 can be switched in accordance with inputted image data, for example.

The sensor control circuit 316 can measure the distance with the viewer by the distance sensor 303 and the angular sensor 304. Data on the distance between the display device and the viewer, obtained by the sensor control circuit 316, is output to the application processor 313.

The application processor 313 is supplied with image data for 2D display or 3D display from the outside. The application processor 313 controls the image data switching circuit 317 in accordance with image data supplied from the outside and data on the distance between the display device and the viewer that is supplied from the sensor control circuit 316. Further, the application processor 313 reads data from the memory 318 in accordance with image data and data on the distance between the display device and the viewer, supplied from the sensor control circuit 316. The application processor 313 controls the shutter panel control circuit 315 in accordance with data read from the memory 318.

The image data switching circuit 317 converts image data supplied to the display panel 311 according to display element units of the pixels.

The display panel control circuit 314 controls display of images on the display panel 311 in accordance with image data converted by the image data switching circuit 317.

The shutter panel control circuit 315 corresponds to the control circuit 203 in FIGS. 1A to 1C or FIGS. 2A to 2C. In the display device illustrated in FIGS. 1A to 1C, the shutter panel control circuit 315 is connected to a transistor for supplying the first voltage in the shutter panel. In the display device illustrated in FIGS. 2A to 2C, the shutter panel control circuit 315 is connected to a transistor for supplying the first voltage and a transistor for supplying the second voltage in the shutter panel. The shutter panel control circuit 315 controls the shutter panel 312 by outputting data set by the application processor 313 as an optical shutter region control signal. In the display device in FIGS. 1A to 1C, the optical shutter region control signal is input to the transistor for supplying the first voltage in the shutter panel. In the display device in FIGS. 2A to 2C, the optical shutter region control signal is input to the transistor for supplying the first voltage and the transistor for supplying the second voltage in the shutter panel.

An example of the operation of the display device in FIG. 5B will be described with reference to FIGS. 6A and 6B.

Figure 6A:
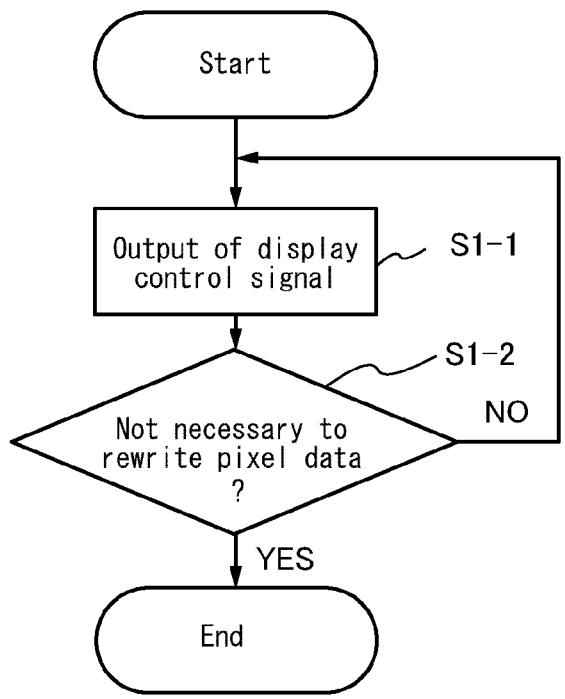
FIGS. 6A and 6B are flow charts illustrating an application example.
Figure 6B:
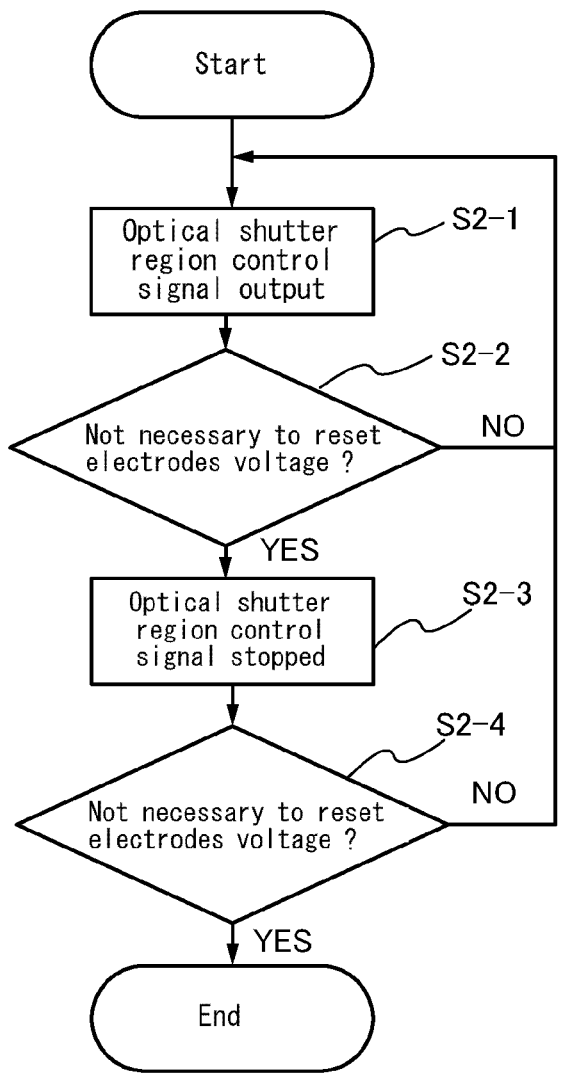

FIGS. 6A and 6B are flow charts for explaining an example of the operation of the display device in FIG. 5B. FIG. 6A is a flow chart for explaining an example of the operation of the display panel 311. FIG. 6B is a flow chart for explaining an example of the operation of the shutter panel 312.

In order to display images, as Step S1-1 in FIG. 6A, a display control signal is output from the display panel control circuit 314 to the display panel 311. Image data is input to the display panel 311 in accordance with the display control signal. The display panel 311 performs display in accordance with the inputted image data. Moreover, as Step S2-1 in FIG. 6B, an optical shutter region control signal is output from the shutter panel control circuit 315 to the shutter panel 312. At this time, in the display device in FIGS. 1A to 1C, the transistor 202 connected to the first electrode 201 is turned on in the shutter panel 20, the first voltage is supplied to the first electrode 201, the second voltage is supplied to the second electrode 204, alignment of liquid crystal molecules in the liquid crystal layer 211 is controlled by the first electrode 201 and the second electrode 204, and the state of each optical shutter region 214 in the shutter panel 20 is set. In the display device in FIGS. 2A to 2C, the transistor 202 connected to the first electrode 201 is turned on in the shutter panel 20 and the first voltage is supplied, the transistor 205 connected to the second electrode 204 is turned on and the second voltage is supplied, alignment of liquid crystal molecules in the liquid crystal layer 211 is controlled by the first voltage and the second voltage, and the state of each optical shutter region 214 in the shutter panel 20 is set.

In order to display 2D images, all the optical shutter regions in the shutter panel 312 are set in a light-transmitting state.

In order to display 3D images, the optical shutter regions in the shutter panel 312 are set in a light-transmitting state or a light-shielding state in accordance with data on the distance between the display device and the viewer.

Next, as shown as Step S1-2 in FIG. 6A, whether to rewrite image data is selected. Moreover, as shown as Step S2-2 in FIG. 6B, whether to reset the first voltage and the second voltage (also referred to as electrode voltages) in the shutter panel 312 is selected.

For example, when a display image is to be rewritten, image data is output to the display panel 311 in accordance with the display control signal in order to rewrite image data. At this time, when data for the display panel 311 is switched from image data for 2D display to image data for 3D display, the first voltage and the second voltage are supplied to the shutter panel 312 in accordance with data on the distance between the display device and the viewer by using the optical shutter region control signal to set each optical shutter region in a light-transmitting state or a light-shielding state. When data for the display panel 311 is switched from image data for 2D display to image data for 2D display or from image data for 3D display to image data for 2D display, the first voltage and the second voltage are supplied to the shutter panel 312 by using the optical shutter region control signal to set all the optical shutter regions in a light-transmitting state.

When the distance between the display device and the viewer is changed as shown in FIG. 5A while 3D images are displayed, the first voltage and the second voltage are supplied again to the shutter panel 312 in accordance with data on the distance between the display device and the viewer, supplied from the sensor control circuit 316, by using the optical shutter region control signal to adjust light-shielding regions in the shutter panel 312. Further, in order to rewrite image data, image data is output to the display panel 311 in accordance with the display control signal and display element units in the display panel 311 are adjusted.

For example, when the viewer gets closer to the display device, light-shielding regions are adjusted in the shutter panel 312 and display element units are adjusted in the display panel 311 as in FIG. 2B. Accordingly, 3D images can be displayed even when the distance between the display device and the viewer is smaller; therefore, the range in which 3D images can be displayed can be extended. Note that when the distance between the display device and the viewer exceeds the range in which 3D images can be displayed, display may be switched from 3D display to 2D display by the display control signal and the optical shutter region control signal.

When the first voltage and the second voltage are not reset, the optical shutter region control signal is stopped as shown in Step S2-3 in FIG. 6B.

For example, when a 2D image is displayed for a given period, the optical shutter region control signal is stopped. At this time, in the display device in FIGS. 1A to 1C, the transistor 202 connected to the first electrode 201 is turned off in the shutter panel 20. In the display device in FIGS. 2A to 2C, the transistor 202 connected to the first electrode 201 and the transistor 205 connected to the second electrode 204 are turned off in the shutter panel 20. Since the off-state current of the transistors 202 and 205 is low, the voltage applied to the electrode in the optical shutter region 214 can be retained.

In addition, when the distance between the display device and the viewer is not changed while 3D images are displayed, the optical shutter region control signal is stopped.

Power consumption can be reduced by stopping the optical shutter region control signal.

Then, as shown as Step S2-4 in FIG. 6B, whether to reset the first voltage and the second voltage in the shutter panel 312 is selected.

For example, when a display image is to be rewritten, image data is output to the display panel 311 in accordance with the display control signal in order to rewrite image data. Note that "rewriting" of a display image refers to, for example, the case where an image is rewritten into the same image (refresh operation is performed) and the case where an image is rewritten into an image based on image data by inversion driving.

At this time, when data for the display panel 311 is switched from image data for 2D display to image data for 3D display, the first voltage and the second voltage are supplied to the shutter panel 312 in accordance with data on the distance between the display device and the viewer, supplied from the sensor control circuit 316, by using the optical shutter region control signal to set each optical shutter region in a light-transmitting state or a light-shielding state. When data for the display panel 311 is switched from image data for 2D display to image data for 2D display or from image data for 3D display to image data for 2D display, the first voltage and the second voltage are supplied to the shutter panel 312 by using the optical shutter region control signal to set all the optical shutter regions in a light-transmitting state.

When the distance between the display device and the viewer is changed as shown in FIG. 5A while 3D images are displayed, image data is output to the display panel 311 in accordance with the display control signal, and the first voltage and the second voltage are supplied to the shutter panel 312 in accordance with data on the distance between the display device and the viewer, supplied from the sensor control circuit 316, by using the optical shutter region control signal to set each of the light-shielding regions in a light-transmitting state or a light-shielding state.

The above is the example of the operation of the display device illustrated in FIG. 5B.

With the above-described structure in this embodiment, the range of distance with which the viewer can see 3D images with the naked eye can be increased; therefore, a highly convenient display device can be provided.

In the display device in this embodiment, it is not necessary to drive the shutter panel constantly; consequently, power consumption of the display device can be reduced.

This embodiment can be implemented in appropriate combination with the structures described in the other embodiments.

Embodiment 2

In this embodiment, specific examples of a shutter panel in the display device according to one embodiment of the present invention will be described. The shutter panel shown in this embodiment is a specific example of the shutter panel 20 illustrated in FIGS. 1A to 1C or FIGS. 2A to 2C.

The shutter panel is constituted by a plurality of optical elements whose state is switched between a light-transmitting state and a light-shielding state. As the optical element, it is preferable to use a liquid crystal element in which liquid crystal is placed between a pair of electrodes. By application of voltage to the liquid crystal element, alignment of the liquid crystal is controlled to selectively control the state (a light-transmitting state or a light-shielding state) of the liquid crystal element.

FIG. 7A is a circuit diagram illustrating an example of the connection relation between the control circuit 203, the transistor 202, and the optical shutter region 214 shown in FIGS. 1A to 1C.

Note that FIG. 7A shows the connection relation between the control circuit 203, the transistor 202, and the optical shutter region 214 shown in FIGS. 1A to 1C; the connection relation between the control circuit 206, the transistor 205, and the optical shutter region 214 shown in FIGS. 2A to 2C is similar to that in FIG. 7A.

FIG. 7A shows the case where a capacitor 550 is connected to the optical shutter region 214 in order to hold a voltage between the first electrode and the second electrode of the optical shutter region 214; however, the capacitor 550 is not always necessary and the voltage can be held by parasitic capacitance of the transistor 202, for example.

Specifically, in FIG. 7A, a gate electrode layer of the transistor 202 and one of a source electrode layer and a drain electrode layer of the transistor 202 are connected to the control circuit 203. The transistor 202 is switched on and off in such a manner that the potential of the gate electrode layer and the potential of one of the source electrode layer and the drain electrode layer are controlled by the control circuit 203.

The other of the source electrode layer and the drain electrode layer of the transistor 202 is connected to the first electrode of the optical shutter region 214 and one electrode of a pair of electrodes of the capacitor 550. The second electrode of the optical shutter region 214 and the other electrode of the pair of electrodes of the capacitor 550 are supplied with a predetermined potential such as a ground potential.

When the transistor 202 is turned on, a potential is supplied from the control circuit 203 to the first electrode of the optical shutter region 214 through the transistor 202. The optical shutter region 214 is brought into a light-shielding state or a light-transmitting state in accordance with the potential. Then, when the transistor 202 is turned off, the voltage between the first electrode and the second electrode of the optical shutter region 214 is maintained, so that the optical shutter region 214 is kept in the light-shielding state or light-transmitting state.

FIGS. 7B and 7C are a cross-sectional view and a plan view of an example of the shutter panel in FIGS. 1A to 1C in the case where a liquid crystal element is used for the optical shutter region 214. FIG. 7B corresponds to a cross-sectional view along dashed line M-N in FIG. 7C. In order to clearly show the structures of the transistor 202, the first electrode of the optical shutter region 214, and the capacitor 550, FIG. 7C illustrates a plan view of a first substrate 501 where the transistor 202, the first electrode of the optical shutter region 214, and the capacitor 550 are provided.

In FIGS. 7B and 7C, the transistor 202 includes a gate electrode layer 502 over the first substrate 501, a gate insulating layer 503 over the gate electrode layer 502, the semiconductor layer 213 provided over the gate insulating layer 503 so as to overlap the gate electrode layer 502, and conductive layers 504 and 505 that are provided over the semiconductor layer 213 and function as a source electrode layer and a drain electrode layer.

FIGS. 7B and 7C show that the transistor 202 is a bottom-gate transistor in which the gate electrode layer 502 is positioned below the semiconductor layer 213. Moreover, FIGS. 7B and 7C show that the transistor 202 is a top-contact transistor in which the conductive layers 504 and 505 functioning as the source and drain electrode layers are positioned above the semiconductor layer 213. Alternatively, the transistor 202 may be a top-gate transistor in which the gate electrode layer is positioned above the semiconductor layer. Alternatively, the transistor 202 may be a bottom-contact transistor in which the conductive layers functioning as the source and drain electrode layers are positioned below the semiconductor layer.

The capacitor 550 includes an electrode layer 506 over the first substrate 501, the gate insulating layer 503 over the electrode layer 506, and the conductive layer 505 provided over the gate insulating layer 503 so as to overlap the electrode layer 506.

In FIGS. 7B and 7C, an insulating layer 507 and an insulating layer 508 are stacked in this order so as to cover the transistor 202 and the capacitor 550. FIGS. 7B and 7C show the case where the insulating layers 507 and 508 form the first insulating layer 212; however, the present invention is not limited to this structure. The first insulating layer 212 may be a single insulating layer or a stack of three or more insulating layers.

The first electrode 201 connected to the conductive layer 505 through a contact hole 509 formed in the insulating layers 507 and 508 is formed over the insulating layer 508.

The shutter panel according to one embodiment of the present invention includes a plurality of transistors 202, a plurality of capacitors 550, and a plurality of first electrodes 201 connected to the transistors 202 and the capacitors 550 as illustrated in FIG. 7C. The plurality of transistors 202 share one gate electrode layer 502. The plurality of capacitors 550 share one electrode layer 506.

In FIG. 7C, the plurality of first electrodes 201 are formed in a stripe pattern. Note that the plurality of first electrodes 201 may have the same width or at least one of the first electrodes 201 may have a different width.

In addition, in the shutter panel according to one embodiment of the present invention, the liquid crystal layer 211 is sandwiched between the plurality of first electrodes 201 and the second electrode 204 provided on a second substrate 510. A region where each of the plurality of first electrodes 201, the liquid crystal layer 211, and the second electrode 204 overlap with each other corresponds to the optical shutter region 214. In other words, the shutter panel according to one embodiment of the present invention includes a plurality of optical shutter regions 214 each of which state is independently selected from a light-shielding state and a light-transmitting state. When 3D images are displayed, light-shielding regions can be selectively formed by controlling the plurality of optical shutter regions 214.

Although not shown in this embodiment, the shutter panel is provided with an optical film such as a polarizing plate, a retardation plate, or an anti-reflection film, or the like as appropriate. For the shutter panel, a transmissive liquid crystal element with a variety of structures and a variety of liquid crystal modes can be employed.

FIGS. 7B and 7C illustrate the case where the capacitor 550 is composed of the gate insulating layer 503, the conductive layer 505, and the electrode layer 506 formed in the layer placed between the first substrate 501 and the gate insulating layer 503, that is, in the same layer as the gate electrode layer 502; however, the present invention is not limited to this structure. The capacitor 550 can be composed of the conductive layer 505, the insulating layer 212, and the first electrode 201.

Figure 8:
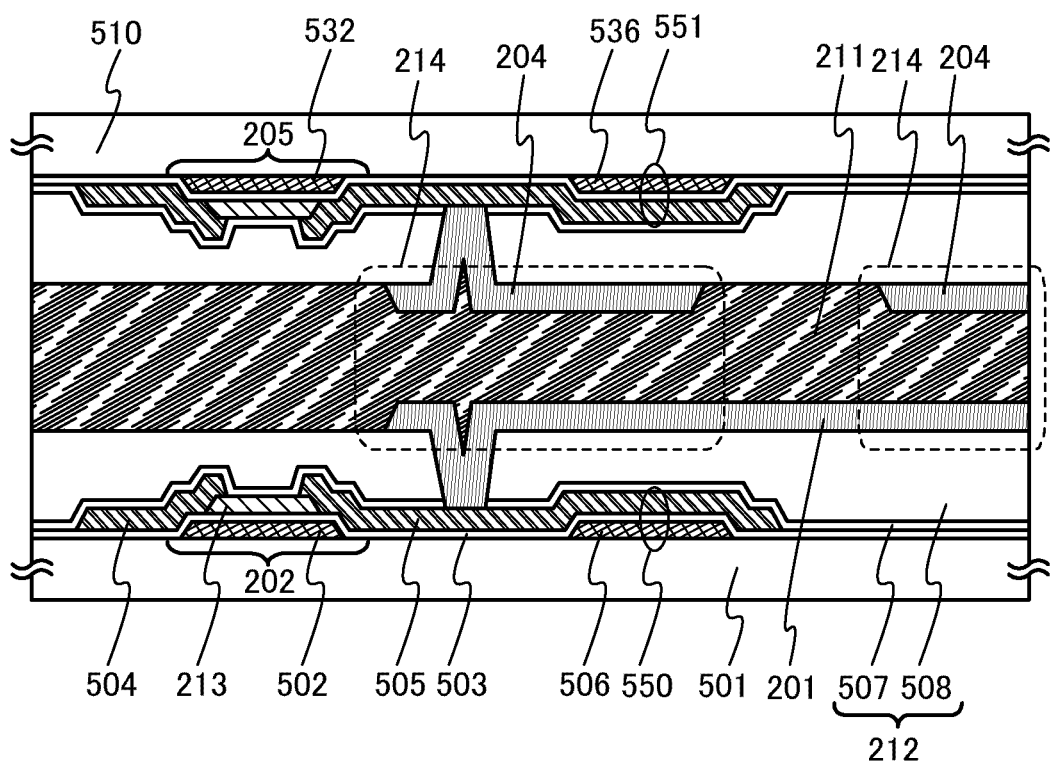
FIG. 8 illustrates a specific structure of a shatter panel.

FIG. 8 is a cross-sectional view of an example of the shutter panel in FIGS. 2A to 2C in the case where a liquid crystal element is used for the optical shutter region 214.

In the shutter panel illustrated in FIG. 8, the transistor 205, a capacitor 551, and the second electrode 204 connected to the transistor 205 and the capacitor 551 are provided on the second substrate 510 as well as over the first substrate 501. Note that FIG. 8 shows part of a cross section of the shutter panel and illustrates one transistor 205 and one capacitor 551; in the shutter panel illustrated in FIGS. 2A to 2C, a plurality of transistors 205, a plurality of capacitors 551, and a plurality of second electrodes 204 connected to the transistors 205 and the capacitors 551 are provided on the second substrate 510.

The plurality of transistors 205 share one gate electrode layer 532. The plurality of capacitors 551 share one electrode layer 536. The plurality of second electrodes 204 are formed in a stripe pattern, and the longitudinal direction of the second electrode 204 crosses the longitudinal direction of the first electrode 201. Note that the plurality of second electrodes 204 may have the same width or at least one of the second electrodes 204 may have a different width.

In addition, in the shutter panel illustrated in FIG. 8, the liquid crystal layer 211 is sandwiched between the plurality of first electrodes 201 and the plurality of second electrodes 204. A region where each of the plurality of first electrodes 201, each of the plurality of second electrodes 204, and the liquid crystal layer 211 overlap with each other corresponds to the optical shutter region 214. In other words, the shutter panel in FIG. 8 includes a plurality of optical shutter regions 214 each of which state is independently selected from a light-shielding state and a light-transmitting state. When 3D images are displayed, light-shielding regions can be selectively formed by controlling the plurality of optical shutter regions 214.

In the shutter panel in FIG. 8, the plurality of optical shutter regions 214 are arranged in a dotted pattern, so that light-shielding regions and light-transmitting regions can be controlled more minutely.

Next, an example of a method for fabricating the shutter panel illustrated in FIGS. 7B and 7C will be described. A description is given below of steps up to and including a step for forming the first electrode 201, which is included in the optical shutter region 214 and provided over the first substrate 501.

Figure 9A:
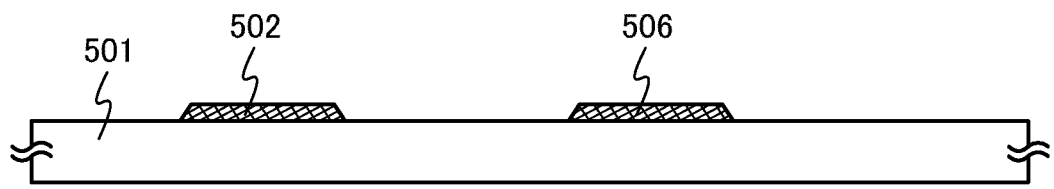
FIGS. 9A to 9D illustrate a method for fabricating a shutter panel.

In this embodiment, first, the gate electrode layer 502 and the electrode layer 506 are formed over the first substrate 501 having an insulating surface as illustrated in FIG. 9A.

Although there is no particular limitation on a material that can be used for the first substrate 501, the material needs to have at least light-transmitting properties and heat resistance high enough to withstand heat treatment to be performed later. For example, a glass substrate formed by a fusion process or a float process, a quartz substrate, a semiconductor substrate, or a ceramic substrate can be used as the first substrate 501. If the temperature of heat treatment to be performed later is high, a glass substrate whose strain point is 730° C. or higher is preferably used. Although a substrate formed using a flexible synthetic resin such as plastics generally has a lower resistance temperature than the aforementioned substrates, it may be used as long as it is resistant to a processing temperature during fabrication steps.

The gate electrode layer 502 and the electrode layer 506 can be formed in such a manner that a conductive layer is formed so as to cover the first substrate 501 and then processed (patterned) into a predetermined shape. The conductive layer can be formed by CVD, sputtering, evaporation, spin coating, or the like. For the conductive layer, tantalum (Ta), tungsten (W), titanium (Ti), molybdenum (Mo), aluminum (Al), copper (Cu), chromium (Cr), niobium (Nb), or the like can be used. An alloy containing any of the above metals as its main component or a compound containing any of the above metals may be used. The thickness of the gate electrode layer 502 and the electrode layer 506 ranges from 10 nm to 400 nm, preferably from 100 nm to 200 nm.

In this embodiment, a 150-nm-thick conductive layer is formed by sputtering using a tungsten target and then etched, thereby forming the gate electrode layer 502 and the electrode layer 506 that have been processed (patterned) into a desired shape. Note that edges of the gate electrode layer 502 and the electrode layer 506 are preferably tapered because coverage thereof with a gate insulating layer to be stacked thereover can be improved.

The gate electrode layer 502 and the electrode layer 506 may be a single conductive layer or a stack of a plurality of conductive layers.

As a combination of two conductive layers, tantalum nitride or tantalum can be used for a first layer, and tungsten can be used for a second layer. Other examples of the combination are tungsten nitride and tungsten, molybdenum nitride and molybdenum, aluminum and tantalum, and aluminum and titanium. Since tungsten and tantalum nitride have high heat resistance, heat treatment aimed at thermal activation can be performed in a step after forming the two conductive layers.

As a structure in which three or more conductive layers are stacked, a stacked structure of a molybdenum layer, an aluminum layer, and a molybdenum layer is preferably used.

Further, a light-transmitting oxide conductive layer of indium oxide, an alloy of indium oxide and tin oxide, an alloy of indium oxide and zinc oxide, zinc oxide, zinc aluminum oxide, zinc aluminum oxynitride, zinc gallium oxide, or the like can be used as the gate electrode layer 502 and the electrode layer 506.

Note that the gate electrode layer 502 and the electrode layer 506 may be selectively formed by droplet discharging without the use of a mask. Droplet discharging refers to a method of forming a predetermined pattern by discharging or jetting a droplet containing a predetermined composition from an orifice. Alternatively, a resist mask may be formed by droplet discharging. A photomask is not used when a resist mask is formed by droplet discharging, which results in reducing fabrication costs.

In addition, the gate electrode layer 502 and the electrode layer 506 can have a desired tapered shape by etching the formed conductive layer by inductively coupled plasma (ICP) etching with appropriate control of the etching conditions (e.g., the amount of power applied to a coiled electrode layer, the amount of power applied to an electrode layer on the substrate side, and the electrode temperature on the substrate side). Further, the angle and the like of the tapered shapes can also be controlled by the shape of a mask. As an etching gas, a chlorine-based gas such as chlorine, boron chloride, silicon chloride, or carbon tetrachloride; a fluorine-based gas such as carbon tetrafluoride, sulfur fluoride, or nitrogen fluoride; or oxygen can be used as appropriate.

Figure 9B:
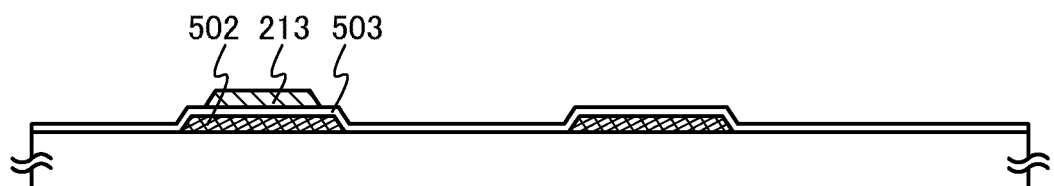

Then, as illustrated in FIG. 9B, the gate insulating layer 503 is formed over the gate electrode layer 502 and the electrode layer 506, and then, the semiconductor layer 213 is formed so as to overlap the gate electrode layer 502 with the gate insulating layer 503 placed therebetween.

The gate insulating layer 503 may be formed using a single layer or a stack of layers containing silicon oxide, silicon nitride oxide, silicon oxynitride, silicon nitride, hafnium oxide, aluminum oxide, tantalum oxide, yttrium oxide, hafnium silicate ($HfSi_xO_y$, (x>0, y>0)), hafnium silicate ($HfSi_xO_y$, (x>0, y>0)) to which nitrogen is added, hafnium aluminate ($HfAl_xO_y$, (x>0, y>0)) to which nitrogen is added, or the like by plasma CVD, sputtering, or the like.

In this specification, oxynitride refers to a material containing a higher quantity of oxygen than that of nitrogen, and nitride oxide refers to a material containing a higher quantity of nitrogen than that of oxygen.

The thickness of the gate insulating layer 503 can be, for example, 1 nm to 100 nm, preferably 10 nm to 50 nm.

The gate insulating layer 503 preferably contains impurities such as moisture and hydrogen as little as possible, and may be formed using a single insulating layer or a stack of a plurality of insulating layers. If hydrogen is contained in the gate insulating layer 503, hydrogen enters the semiconductor layer 213 to be formed later or extract oxygen in the semiconductor layer 213, whereby the semiconductor layer 213 has lower resistance (n-type conductivity) and thus a parasitic channel might be formed. Therefore, it is important to employ a formation method in which hydrogen is not used so that the gate insulating layer 503 contains as little hydrogen as possible. A material with high barrier properties is preferably used for the gate insulating layer 503. For example, as an insulating layer with high barrier properties, a silicon nitride layer, a silicon nitride oxide layer, an aluminum nitride layer, an aluminum nitride oxide layer, or the like can be used. When a plurality of insulating layers stacked are used, an insulating layer with a low content nitrogen, such as a silicon oxide layer or a silicon oxynitride layer, is formed on the side closer to the semiconductor layer 213 than the insulating layer with high barrier properties. By using the insulating layer with high barrier properties, impurities such as moisture or hydrogen can be prevented from entering the semiconductor layer 213, the gate insulating layer 503, or the interface between the semiconductor layer 213 and another insulating layer and the vicinity thereof. In addition, when the insulating layer having a low content of nitrogen, such as a silicon oxide layer or a silicon oxynitride layer, is formed in contact with the semiconductor layer 213, the insulating layer formed using a material with high barrier properties can be prevented from being directly in contact with the semiconductor layer 213.

In this embodiment, a 30-nm-thick silicon oxynitride layer formed by sputtering is used as the gate insulating layer 503. The substrate temperature in film formation may range from room temperature to 400° C. and is 300° C. in this embodiment.

The semiconductor layer 213 can be formed by processing an oxide semiconductor layer formed over the gate insulating layer 503 into a desired shape. The thickness of the oxide semiconductor layer is 2 nm to 200 nm, preferably 3 nm to 50 nm, further preferably 3 nm to 20 nm. The oxide semiconductor layer is formed by sputtering using an oxide semiconductor target. Moreover, the oxide semiconductor layer can be formed by sputtering in a rare gas (e.g., argon) atmosphere, an oxygen atmosphere, or a mixed atmosphere including a rare gas (e.g., argon) and oxygen.

Note that before the oxide semiconductor layer is formed by sputtering, dust attached to a surface of the gate insulating layer 503 is preferably removed by reverse sputtering in which plasma is generated by introduction of an argon gas. The reverse sputtering refers to a method in which, without application of voltage to a target side, an RF power source is used for application of voltage to a substrate side in an argon atmosphere to generate plasma in the vicinity of the substrate to modify a surface. Note that instead of an argon atmosphere, a nitrogen atmosphere, a helium atmosphere, or the like may be used. Alternatively, an argon atmosphere to which oxygen, nitrous oxide, or the like is added may be used. Alternatively, an argon atmosphere to which chlorine, carbon tetrafluoride, or the like is added may be used.

The oxide semiconductor layer can be formed using any of the following oxide semiconductors, for example: an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are metal oxides of three metal elements; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, and In—Ga—O-based oxide semiconductor which are metal oxides of two metal elements; and an In—O-based oxide semiconductor, a Sn—O-based oxide semiconductor, and a Zn—O-based oxide semiconductor which are metal oxides of one metal element.

In this embodiment, as the oxide semiconductor layer, an In—Ga—Zn—O-based oxide semiconductor thin film with a thickness of 30 nm, which is obtained by sputtering using a target containing indium (In), gallium (Ga), and zinc (Zn), is used. As the above target, a target having a composition ratio of $In_2O_3:Ga_2O_3:ZnO=1:1:1$ [molar ratio] is used, for example. Alternatively, a target having a composition ratio of $In_2O_3:Ga_2O_3:ZnO=1:1:2$ [molar ratio] or a target having a composition ratio of $In_2O_3:Ga_2O_3:ZnO=1:1:4$ [molar ratio] can be used. The filling rate of the target containing In, Ga, and Zn is 90% or higher and 100% or lower, and preferably 95% or higher and lower than 100%. With the use of the target with a high filling rate, a dense oxide semiconductor layer is deposited.

When an In—Zn—O-based material is used as the oxide semiconductor, a target to be used has a composition ratio of In:Zn=50:1 to 1:2 in an atomic ratio ($In_2O_3:ZnO=25:1$ to 1:4 in a molar ratio), preferably In:Zn=20:1 to 1:1 in an atomic ratio ($In_2O_3:ZnO=10:1$ to 1:2 in a molar ratio), further preferably In:Zn=15:1 to 1.5:1 in an atomic ratio ($In_2O_3$:ZnO=15:2 to 3:4 in a molar ratio). For example, when a target used for forming an In—Zn—O-based oxide semiconductor has an atomic ratio of In:Zn:O=X:Y:Z, Z>1.5X+Y is satisfied. The mobility can be increased by keeping the ratio of Zn within the above range.

In this embodiment, the oxide semiconductor layer is formed in such a manner that the substrate is held in a treatment chamber kept in a reduced pressure, a sputtering gas from which hydrogen and moisture are removed is introduced into the treatment chamber while residual moisture therein is removed, and the above target is used. The substrate temperature may be 100° C. to 600° C., preferably 200° C. to 400° C. in the film formation. By heating the substrate during the film formation, the impurity concentration in the oxide semiconductor layer can be reduced. In addition, damage by sputtering can be reduced. In order to remove remaining moisture in the treatment chamber, an entrapment vacuum pump is preferably used. For example, a cryopump, an ion pump, or a titanium sublimation pump is preferably used. The evacuation unit may be a turbo pump provided with a cold trap. In the treatment chamber which is evacuated with the cryopump, for example, a hydrogen atom, a compound containing a hydrogen atom, such as water ($H_2O$) (more preferably, also a compound containing a carbon atom), and the like are removed, whereby the impurity concentration in the oxide semiconductor layer formed in the treatment chamber can be reduced.

As one example of the deposition conditions, the distance between the substrate and the target is 100 mm, the pressure is 0.6 Pa, the direct-current (DC) power is 0.5 kW, and the atmosphere is an oxygen atmosphere (the proportion of the oxygen flow rate is 100%). Note that a pulsed direct-current (DC) power source is preferable because dust generated in deposition can be reduced and the film thickness can be made uniform.

When the leakage rate of the treatment chamber of the sputtering apparatus is set less than or equal to $1\times10^{-10}$ $Pa\cdot m^3/s$, entry of impurities such as alkali metal or hydride into the oxide semiconductor layer that is being formed by sputtering can be reduced. Further, with the use of an entrapment vacuum pump as an exhaustion system, counter flow of impurities such as alkali metal, hydrogen atoms, hydrogen molecules, water, a hydroxyl group, or hydride from the exhaustion system can be reduced.

When the purity of the target is set to 99.99% or higher, entry of alkali metal, hydrogen atoms, hydrogen molecules, water, a hydroxyl group, hydride, and the like into the oxide semiconductor layer can be suppressed. In addition, the use of such a target leads to a reduction in the concentration of alkali metal such as lithium, sodium, or potassium in the oxide semiconductor layer.

In order that the oxide semiconductor layer does not to contain impurities such as hydrogen, a hydroxyl group, and moisture as little as possible, it is preferable to preheat the first substrate 501 provided with the gate insulating layer 503 in a preheating chamber of the sputtering apparatus before the film formation so that impurities such as moisture or hydrogen adsorbed on the first substrate 501 are eliminated and removed. The temperature of the preheating is 100° C. to 400° C., preferably 150° C. to 300° C. A cryopump is preferably provided as an evacuation unit in the preheating chamber. Note that this preheating treatment can be skipped.

Note that etching for forming the semiconductor layer 213 may be wet etching, dry etching, or both dry etching and wet etching. As an etching gas for dry etching, a gas containing chlorine (a chlorine-based gas such as chlorine ($Cl_2$), boron trichloride ($BCl_3$), silicon tetrachloride ($SiCl_4$), or carbon tetrachloride ($CCl_4$)) is preferably used. Alternatively, it is possible to use a gas containing fluorine (a fluorine-based gas such as carbon tetrafluoride ($CF_4$), sulfur hexafluoride ($SF_6$), nitrogen trifluoride ($NF_3$), or trifluoromethane ($CHF_3$)), hydrogen bromide (HBr), oxygen ($O_2$), any of these gases to which a rare gas such as helium (He) or argon (Ar) is added, or the like.

As the dry etching method, a parallel plate RIE (reactive ion etching) method or an ICP (inductively coupled plasma) etching method can be used. In order to etch the film into a desired shape, the etching conditions (e.g., the amount of power applied to a coiled electrode, the amount of power applied to an electrode on the substrate side, and the electrode temperature on the substrate side) are adjusted as appropriate.

As an etchant used for wet etching, a mixed solution of phosphoric acid, acetic acid, and nitric acid, or organic acid such as citric acid or oxalic acid can be used. In this embodiment, ITO-07N (produced by Kanto Chemical Co., Inc.) is used.

A resist mask for forming the semiconductor layer 213 may be formed by droplet discharging. A photomask is not used when a resist mask is formed by droplet discharging, which results in reducing fabrication costs.

Note that reverse sputtering is preferably performed before a conductive layer is formed in a subsequent step, in order to remove a resist residue attached to surfaces of the semiconductor layer 213 and the gate insulating layer 503.

Note that the oxide semiconductor layer formed by sputtering or the like sometimes contains a large amount of moisture or hydrogen (including a hydroxyl group) as impurities. Moisture and hydrogen easily form a donor level and thus serve as impurities in the oxide semiconductor. In one embodiment of the present invention, in order to reduce impurities such as moisture and hydrogen in the oxide semiconductor layer (dehydrate or dehydrogenate the oxide semiconductor layer), the semiconductor layer 213 is subjected to heat treatment in a reduced-pressure atmosphere, an inert gas atmosphere of nitrogen, a rare gas, or the like, an oxygen gas atmosphere, or an ultra dry air (the air whose moisture amount is 20 ppm (−55° C. by conversion into a dew point) or less, preferably 1 ppm or less, further preferably 10 ppb or less, in the case where measurement is performed with a dew point meter in a cavity ring down laser spectroscopy (CRDS) method) atmosphere.

Heat treatment performed on the semiconductor layer 213 can eliminate moisture or hydrogen in the semiconductor layer 213. Specifically, heat treatment may be performed at a temperature higher than or equal to 250° C. and lower than or equal to 750° C., preferably higher than or equal to 400° C. and lower than the strain point of the substrate. For example, heat treatment may be performed at 500° C. for approximately 3 to 6 minutes. When an RTA method is used for the heat treatment, dehydration or dehydrogenation can be performed in a short time; therefore, treatment can be performed even at a temperature higher than the strain point of a glass substrate.

In this embodiment, an electric furnace which is one of heat treatment apparatuses is used.

Note that a heat treatment apparatus is not limited to an electric furnace, and may include a device for heating an object by heat conduction or heat radiation from a heating element such as a resistance heating element. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the gas, an inert gas which does not react with an object by heat treatment, for example, nitrogen or a rare gas such as argon is used.

In the heat treatment, it is preferable that moisture, hydrogen, and the like be not contained in nitrogen or a rare gas such as helium, neon, or argon. It is preferable that the purity of nitrogen or the rare gas such as helium, neon, or argon which is introduced into a heat treatment apparatus be set to 6N (99.9999%) or higher, preferably 7N (99.99999%) or higher (i.e., the impurity concentration is 1 ppm or lower, preferably 0.1 ppm or lower).

Note that it has been pointed out that an oxide semiconductor is insensitive to impurities, there is no problem when a considerable amount of metal impurities is contained in the film, and therefore, soda-lime glass which contains a large amount of alkali metal such as sodium and is inexpensive can also be used (Kamiya, Nomura, and Hosono, "Engineering application of solid state physics: Carrier transport properties and electronic structures of amorphous oxide semiconductors: the present status", *KOTAI BUTSURI (SOLID STATE PHYSICS)*, 2009, Vol. 44, pp. 621-633). Such consideration, however, is not appropriate. Alkali metal is not a constituent element of an oxide semiconductor and is therefore an impurity. Alkaline earth metal also serves as an impurity in the case where alkaline earth metal is not a constituent element of an oxide semiconductor. When an insulating layer in contact with the oxide semiconductor layer is an oxide, Na, among the alkali metals, diffuses into the insulating layer and becomes $Na^+$. Further, in the oxide semiconductor layer, Na cuts or enters a bond between metal and oxygen which are included in the oxide semiconductor, causing deterioration of transistor characteristics (e.g., normally-on state of the transistor due to a negative shift of the threshold voltage or the decrease in mobility) and variations in the characteristics. Such deterioration of characteristics and variations in the characteristics of the transistor due to the impurity are significant especially in the case where the hydrogen concentration of the oxide semiconductor layer is extremely low. Therefore, the concentration of the above impurity is preferably reduced when the hydrogen concentration of the oxide semiconductor layer is $1\times10^{18}/cm^3$ or lower, preferably $1\times10^{17}/cm^3$ or lower. Specifically, the measurement value of the Na concentration by secondary ion mass spectrometry is preferably $5\times10^{16}/cm^3$ or lower, further preferably less $1\times10^{16}/cm^3$, still more preferably $1\times10^{15}/cm^3$ or lower. Similarly, the measurement value of the Li concentration is preferably $5\times10^{15}/cm^3$ or lower, further preferably $1\times10^{15}/cm^3$ or lower. Similarly, the measurement value of the K concentration is preferably $5\times10^{15}/cm^3$ or lower, further preferably $1\times10^{15}/cm^3$ or lower.

Through the above steps, the concentration of hydrogen in the semiconductor layer 213 can be reduced and the semiconductor layer can be highly purified. Consequently, the oxide semiconductor layer can be stable. In addition, heat treatment at a temperature lower than or equal to the glass transition temperature makes it possible to form an oxide semiconductor layer with extremely low carrier density and a wide band gap. Therefore, the transistor can be manufactured using a large-sized substrate, so that the productivity can be increased. Further, by using the oxide semiconductor layer in which the hydrogen concentration is reduced and the purity is improved, a transistor with high withstand voltage and an extremely low off-state current can be fabricated. The above heat treatment can be performed at any time as long as it is performed after the oxide semiconductor layer is formed.

Note that the oxide semiconductor layer may be amorphous or may have crystallinity. For an oxide semiconductor layer having crystallinity, a crystalline oxide semiconductor layer with c-axis orientation (also referred to as c-axis aligned crystalline oxide semiconductor (CAAC-OS)) is preferably used because the effect of improving the reliability of a transistor can be obtained.

An oxide semiconductor layer composed of the CAAC-OS can be formed by sputtering. In order to obtain the CAAC-OS by sputtering, it is important to form hexagonal crystals in an initial stage of deposition of an oxide semiconductor layer and to cause crystal growth from the hexagonal crystals as seeds. In order to achieve this, it is preferable that the distance between the target and the substrate be made large (e.g., 150 mm to 200 mm) and the substrate heating temperature be 100° C. to 500° C., more preferably 200° C. to 400° C., further preferably 250° C. to 300° C. In addition, the deposited oxide semiconductor layer is preferably subjected to heat treatment at a temperature higher than the substrate heating temperature during the deposition, whereby micro-defects in the film and defects at the interface with a stacked layer can be repaired.

Specifically, the CAAC-OS is non-single-crystal and has a triangular, hexagonal, regular triangular, or regular hexagonal atomic arrangement when seen from the direction perpendicular to the a-b plane. Moreover, the CAAC-OS has a phase in which metal atoms are arranged in a layered manner in the c-axis direction or a phase in which metal atoms and oxygen atoms are arranged in a layered manner in the c-axis direction.

In the CAAC-OS, metal atoms and oxygen atoms are bonded in an orderly manner in comparison with an amorphous oxide semiconductor. In other words, the coordination numbers of oxygen atoms around metal atoms might vary between metal atoms in the case where an oxide semiconductor is amorphous, whereas the coordination numbers of oxygen atoms around metal atoms are almost the same in the CAAC-OS. Therefore, microscopic defects of oxygen can be reduced, and instability and moving of charge due to attachment and detachment of hydrogen atoms (including hydrogen ions) or alkali metal atoms can be reduced.

Consequently, when a transistor is formed using an oxide semiconductor layer composed of the CAAC-OS, it is possible to reduce the amount of change in the threshold voltage of the transistor between before and after light irradiation and a bias-temperature stress (BT) test performed on the transistor. As a result, a transistor having stable electric characteristics can be formed.

Figure 9C:
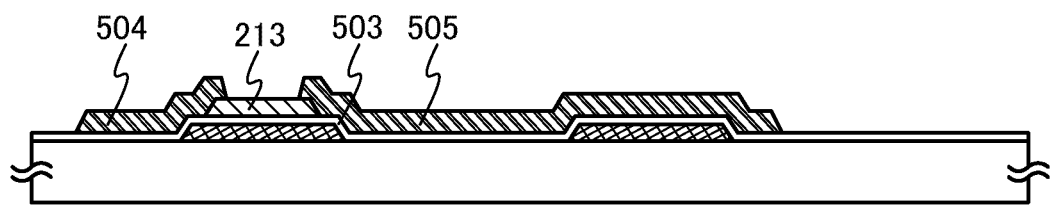

Next, as illustrated in FIG. 9C, the conductive layers 504 and 505 are formed over the semiconductor layer 213 and the gate insulating layer 503. Part of the conductive layer 505 overlaps the electrode layer 506 with the gate insulating layer 503 placed therebetween.

A conductive layer serving as the conductive layers 504 and 505 can be formed using, for example, an element selected from aluminum, chromium, copper, tantalum, titanium, molybdenum, or tungsten; an alloy containing any of these elements; or an alloy layer containing the above elements in combination. It is possible to employ a structure in which a layer of a refractory metal such as chromium, tantalum, titanium, molybdenum, or tungsten is stacked over or below a metal layer of aluminum, copper, or the like. Aluminum or copper is preferably combined with a refractory metal material so as to prevent a heat resistance problem and a corrosion problem. As the refractory metal material, molybdenum, titanium, chromium, tantalum, tungsten, neodymium, scandium, yttrium, or the like can be used.

The conductive layer serving as the conductive layers 504 and 505 may have a single-layer structure or a stacked structure of two or more layers. For example, the conductive layer can have a single-layer structure of an aluminum layer containing silicon, a two-layer structure in which a titanium layer is stacked over an aluminum layer, or a three-layer structure in which a titanium layer, an aluminum layer, and a titanium layer are stacked in the order presented. A Cu—Mg—Al alloy, a Cu—Mg—O alloy, a Cu—Ca—O alloy, a Cu—Mg—Al—O alloy, a Mo—Ti alloy, Ti, and Mo have high adhesion to an oxide insulating layer. Therefore, when the conductive layers 504 and 505 are formed using a stack of a lower conductive layer of a Cu—Mg—Al alloy, a Cu—Mg—O alloy, a Cu—Ca—O alloy, a Cu—Mg—Al—O alloy, a Mo—Ti alloy, Ti, or Mo and an upper conductive layer with low resistance, such as a Cu layer, the adhesion of the conductive layers 504 and 505 to the gate insulating layer 503 which is an oxide insulating layer can be increased.

For the conductive layer serving as the conductive layers 504 and 505, a conductive metal oxide may be used. As the conductive metal oxide, indium oxide, tin oxide, zinc oxide, an alloy of indium oxide and tin oxide, an alloy of indium oxide and zinc oxide, or the metal oxide material containing silicon or silicon oxide can be used.

In the case where heat treatment is performed after the formation of the conductive layers 504 and 505, the conductive layers 504 and 505 preferably have heat resistance high enough to withstand the heat treatment.

In this embodiment, a 150-nm-thick tungsten layer is used as the conductive layers 504 and 505.

Note that the materials and etching conditions are adjusted as appropriate so that the semiconductor layer 213 is not removed as much as possible in etching of the conductive layer. Depending on etching conditions, an exposed portion of the semiconductor layer 213 is partly etched and thus a groove (a recessed portion) is formed in some cases.

In this embodiment, a tungsten layer is used as the conductive layer serving as the conductive layers 504 and 505. Therefore, the conductive layer can be selectively etched by wet etching using a solution (an ammonia hydrogen peroxide mixture) containing ammonia and hydrogen peroxide water. Specifically, an ammonia hydrogen peroxide mixture in which oxygenated water of 31 wt %, ammonia water of 28 wt %, and water are mixed at a volume ratio of 5:2:2 is used. Alternatively, the conductive layer may be subjected to dry etching using a gas containing carbon tetrafluoride (CF), chlorine ($Cl_2$), or oxygen.

In order to reduce the number of photomasks and steps in a photolithography process, etching may be performed with the use of a resist mask formed using a multi-tone mask which is a light-exposure mask through which light is transmitted so as to have a plurality of intensities. A resist mask formed using a multi-tone mask has a plurality of thicknesses and can be changed in shape by etching; thus, the resist mask can be used in a plurality of etching processes for processing films into different patterns. Therefore, a resist mask corresponding to at least two kinds of different patterns can be formed by one multi-tone mask. Thus, the number of light-exposure masks can be reduced and the number of corresponding photolithography processes can be also reduced, whereby the fabrication process can be simplified.

An oxide conductive layer functioning as a source region and a drain region may be provided between the semiconductor layer 213 and the conductive layers 504 and 505. A material of the oxide conductive layer preferably contains zinc oxide as a component and preferably does not contain indium oxide. For such an oxide conductive layer, zinc oxide, zinc aluminum oxide, zinc aluminum oxynitride, gallium zinc oxide, or the like can be used.

For example, in the case where the oxide conductive layer is formed, patterning for forming the oxide conductive layer and patterning for forming the conductive layers 504 and 505 may be concurrently performed.

By providing the oxide conductive layer functioning as the source and drain regions, resistance between the semiconductor layer 213 and the conductive layers 504 and 505 can be lowered, so that the transistor can operate at high speed. In addition, by providing the oxide conductive layer functioning as the source and drain regions, the withstand voltage of the transistor can be increased.

Figure 9D:
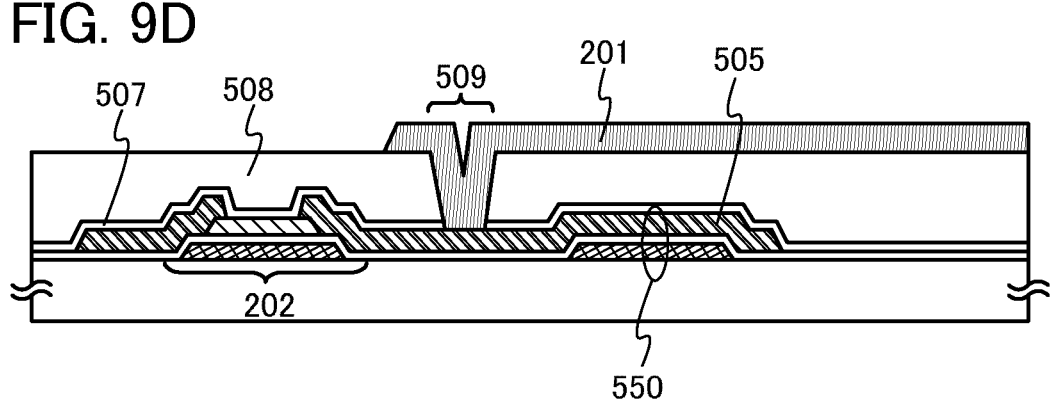

Next, as illustrated in FIG. 9D, the insulating layer 507 and the insulating layer 508 are stacked in this order so as to cover the conductive layers 504 and 505 and the semiconductor layer 213. Then, an opening is formed in the insulating layers 507 and 508, and the first electrode 201 in contact with the conductive layer 505 through the opening is formed over the insulating layer 508.

Specifically, the insulating layers 507 and 508 can be an inorganic insulating layer of silicon oxide, silicon nitride, silicon nitride oxide, silicon oxynitride, aluminum nitride, aluminum nitride oxide, or the like. In particular, a low dielectric constant (low-k) material is preferably used for the insulating layers 507 and 508 because capacitance caused by an overlap of electrodes or wirings can be sufficiently reduced. Note that a porous insulating layer containing such a material may be used as the insulating layers 507 and 508. Since the porous insulating layer has lower dielectric constant than a dense insulating layer, parasitic capacitance due to electrodes or wirings can be further reduced.

In this embodiment, as an example, a silicon nitride oxide layer with a thickness of about 100 nm is used as the insulating layer 507 and a silicon oxynitride layer with a thickness of 450 nm is used as the insulating layer 508. This embodiment shows the example in which the insulating layers 507 and 508 are formed; however, in the present invention, only one insulating layer or a stack of three or more insulating layers may be formed so as to cover the conductive layers 504 and 505 and the semiconductor layer 213.

As the insulating layers 507 and 508, a silicon oxide layer formed by chemical vapor deposition using organosilane can be used. As organosilane, tetraethoxysilane (TEOS: $Si(OC_2H_5)_4$), trimethylsilane (TMS: $(CH_3)_3SiH$), tetramethylcyclotetrasiloxane (TMCTS), octamethylcyclotetrasiloxane (OMCTS), hexamethyldisilazane (HMDS), triethoxysilane ($SiH(OC_2H_5)_3$), tris(dimethylamino)silane ($SiH(N(CH_3)_2)_3$), or the like can be used. Needless to say, silicon oxide, silicon oxynitride, silicon nitride, silicon nitride oxide, or the like may be formed using inorganic silane such as monosilane, disilane, or trisilane.

Note that heat treatment may be performed after the insulating layer 507 or the insulating layer 508 is formed. The heat treatment is performed in a nitrogen atmosphere, an ultra dry air, or a rare gas (e.g., argon or helium) atmosphere preferably at temperatures ranging from 200° C. to 400° C., for example, from 250° C. to 350° C. It is preferable that the water content in the gas be 20 ppm or less, preferably 1 ppm or less, further preferably 10 ppb or less. In this embodiment, for example, heat treatment is performed at 250° C. for one hour in a nitrogen atmosphere. Alternatively, RTA treatment for a short time at a high temperature may be performed before the formation of the conductive layers 504 and 505, in a manner similar to that of the previous heat treatment performed on the oxide semiconductor layer for reduction of moisture or hydrogen. Even when oxygen vacancies are generated in the semiconductor layer 213 because of the previous heat treatment performed on the oxide semiconductor layer, by performing heat treatment after the insulating layer 507 containing oxygen is provided, oxygen is supplied to the semiconductor layer 213 from the insulating layer 507. By supplying oxygen to the semiconductor layer 213, oxygen vacancies that serve as donors can be reduced in the semiconductor layer 213 and the stoichiometric ratio can be satisfied. The semiconductor layer 213 preferably contains much oxygen that exceeds the stoichiometric proportion. As a result, the semiconductor layer 213 can be made substantially i-type and variation in electrical characteristics of the transistor due to oxygen vacancies can be reduced, which results in improvement of electrical characteristics. There is no particular limitation on the timing of this heat treatment as long as it is after the formation of the insulating layer 507. When this heat treatment doubles as another step such as heat treatment for formation of a resin layer or heat treatment for reduction of the resistance of a conductive layer, the semiconductor layer 213 can be made to be substantially i-type without increase in the number of steps.

Further, oxygen vacancies that serve as donors in the semiconductor layer 213 may be reduced by performing heat treatment on the semiconductor layer 213 in an oxygen atmosphere so that oxygen is added to the oxide semiconductor. The heat treatment is performed at a temperature of, for example, higher than or equal to 100° C. and lower than 350° C., preferably higher than or equal to 150° C. and lower than 250° C. It is preferable that an oxygen gas used for the heat treatment under an oxygen atmosphere do not include water, hydrogen, or the like. The purity of an oxygen gas introduced into a heat treatment apparatus is preferably 6N (99.9999%) or higher, further preferably 7N (99.99999%) or higher (i.e., the impurity concentration in the oxygen is preferably 1 ppm or lower, further preferably 0.1 ppm or lower).

Alternatively, an ion implantation method, an ion doping method, or the like may be employed to add oxygen to the semiconductor layer 213 so that oxygen vacancies serving as donors are reduced. For example, oxygen which is made into a plasma state with a microwave at 2.45 GHz may be added to the semiconductor layer 213.

As the first electrode 201, a light-transmitting conductive layer is used. The light-transmitting conductive layer is formed using indium oxide, an alloy of indium oxide and tin oxide, or the like by sputtering, vacuum evaporation, or the like. Alternatively, the light-transmitting conductive layer may be formed using an Al—Zn—O-based oxide semiconductor containing nitrogen, a Zn—O-based oxide semiconductor containing nitrogen, or a Sn—Zn—O-based oxide semiconductor containing nitrogen.

Through the above steps, the transistor 202, the first electrode 201 included in the optical shutter region 214, and the capacitor 550 are formed over the first substrate 501.

Although FIGS. 9A to 9D show the example in which the transistor 202 is a single-gate transistor, a multi-gate transistor that includes a plurality of gate electrode layers electrically connected to each other and thus has a plurality of channel formation regions can be formed, if needed.

Note that an insulating layer in contact with the semiconductor layer 213 (which corresponds to the gate insulating layer 503 and the insulating layer 507 in this embodiment) may be formed using an insulating material containing an element of Group 13 and oxygen. Many of oxide semiconductor materials contain elements of Group 13, and an insulating material containing an element of Group 13 is compatible with an oxide semiconductor. Thus, when an insulating material containing an element of Group 13 is used for the insulating layer in contact with the oxide semiconductor layer, the state of the interface between the oxide semiconductor layer and the insulating film can be kept favorable.

An insulating material containing a Group 13 element refers to an insulating material containing one or plural kinds of Group 13 elements. Examples of the insulating material containing a Group 13 element are gallium oxide, aluminum oxide, aluminum gallium oxide, and gallium aluminum oxide. Here, aluminum gallium oxide refers to a material in which the aluminum content is higher than that the gallium content in atomic percent (at. %), and gallium aluminum oxide refers to a material in which the gallium content is higher than or equal to the aluminum content in atomic percent (at. %).

For example, when an insulating layer is formed in contact with an oxide semiconductor layer containing gallium, the use of a material containing gallium oxide for the insulating layer makes it possible to keep characteristics at the interface between the oxide semiconductor layer and the insulating layer favorable. For instance, the oxide semiconductor layer and an insulating layer containing gallium oxide are provided in contact with each other, so that pile up of hydrogen at the interface between the oxide semiconductor layer and the insulating layer can be reduced. Note that a similar effect can be obtained when an element in the same group as a constituent element of the oxide semiconductor layer is used for the insulating layer. For example, it is effective to form an insulating layer with the use of a material containing aluminum oxide. Note that aluminum oxide does not easily transmit water; therefore, it is preferable to use a material containing aluminum oxide in terms of preventing entry of water to the oxide semiconductor layer.

The insulating layer in contact with the semiconductor layer 213 is preferably made to contain oxygen in a proportion higher than that in the stoichiometric composition by heat treatment in an oxygen atmosphere, oxygen doping, or the like. Oxygen doping refers to addition of oxygen into a bulk. Note that the term "bulk" is used in order to clarify that oxygen is added not only to a surface of a thin film but also to the inside of the thin film. In addition, "oxygen doping" includes oxygen plasma doping by which oxygen plasma is added to a bulk. The oxygen doping may be performed by an ion implantation method or an ion doping method.

For example, in the case where gallium oxide is used for the insulating layer in contact with the semiconductor layer 213, the composition of gallium oxide can be set to be $Ga_2O_x$ ($x=3+\alpha$, where $0<\alpha<1$) by heat treatment in an oxygen atmosphere or oxygen doping.

In the case where aluminum oxide is used for the insulating layer in contact with the semiconductor layer 213, the composition of aluminum oxide can be set to be $Al_2O_x$ ($x=3+\alpha$, where $0<\alpha<1$) by heat treatment in an oxygen atmosphere or oxygen doping.

In the case where gallium aluminum oxide (aluminum gallium oxide) is used for the insulating layer in contact with the semiconductor layer 213, the composition of gallium aluminum oxide (aluminum gallium oxide) can be set to be $Ga_xAl_{2-x}O_{3+\alpha}$ ($0<x<2$, $0<\alpha<1$) by heat treatment in an oxygen atmosphere or oxygen doping.

By oxygen doping, an insulating layer including a region where the proportion of oxygen is higher than that in the stoichiometric composition can be formed. When the insulating layer including such a region is in contact with the oxide semiconductor layer, oxygen that exists excessively in the insulating layer is supplied to the oxide semiconductor layer, and oxygen vacancies in the oxide semiconductor layer or at the interface between the oxide semiconductor layer and the insulating layer are reduced. Thus, the oxide semiconductor layer can be i-type or substantially i-type.

The insulating layer including a region where the proportion of oxygen is higher than that in the stoichiometric composition may be used as either the insulating layer placed above the semiconductor layer 213 or the insulating layer placed below the semiconductor layer 213 of the insulating layers in contact with the semiconductor layer 213; it is preferably used as both of the insulating layers in contact with the semiconductor layer 213. The above-described effect can be enhanced with a structure where the insulating layers including a region where the proportion of oxygen is higher than that in the stoichiometric composition are used as the insulating layers that are in contact with the semiconductor layer 213 and placed above and below the semiconductor layer 213 so that the semiconductor layer 213 is sandwiched therebetween.

The insulating layers placed above and below the semiconductor layer 213 may contain the same constituent element or different constituent elements. For example, both of the insulating layers placed above and below the semiconductor layer 213 may be formed using gallium oxide whose composition is $Ga_2O_x$ ($x=3+\alpha$, where $0<\alpha<1$). Alternatively, one of these insulating layers may be formed using gallium oxide whose composition is $Ga_2O_x$ ($x=3+\alpha$, where $0<\alpha<1$) and the other thereof may be formed using aluminum oxide whose composition is $Al_2O_x$ ($x=3+\alpha$, where $0<\alpha<1$).

The insulating layer in contact with the semiconductor layer 213 may be a stack of insulating layers each of which includes a region where the proportion of oxygen is higher than that in the stoichiometric composition. For example, the insulating layer placed above the semiconductor layer 213 may be formed as follows: gallium oxide whose composition is $Ga_2O_x$ ($x=3+\alpha$, where $0<\alpha<1$) is formed and gallium aluminum oxide (aluminum gallium oxide) whose composition is $Ga_xAl_{2-x}O_{3+\alpha}$ ($0<x<2$, $0<\alpha<1$) is formed thereover. Note that it is possible that the insulating layer placed below the semiconductor layer 213, or both of the insulating layers placed above and below the semiconductor layer 213 may be a stack of insulating layers each of which includes a region where the proportion of oxygen is higher than that in the stoichiometric composition.

The fabrication method illustrated in FIGS. 9A to 9D can be applied not only to the shutter panel illustrated in FIGS. 1A to 1C but also to the shutter panel illustrated in FIGS. 2A to 2C. In the shutter panel illustrated in FIGS. 2A to 2C, the second transistor, the capacitor, and the second electrode included in the optical shutter region can be formed over the second substrate by the fabrication method illustrated in FIGS. 9A to 9D.

This embodiment can be implemented in appropriate combination with the structures described in the other embodiments.

Embodiment 3

In this embodiment, examples of the structure of a display panel applicable to the display panel in Embodiment 1 will be described with reference to FIGS. 10A and 10B and FIGS. 11A and 11B.

As a display element provided in the display panel, a light-emitting element (also referred to as a light-emitting display element) or a liquid crystal element (also referred to as a liquid crystal display element) can be used. A light-emitting element includes, in its category, an element whose luminance is controlled by current or voltage, and specifically includes an inorganic electroluminescent (EL) element, an organic EL element, and the like.

FIGS. 10A and 10B illustrate an example of the structure of a display panel in which an organic EL element is used as a display element. FIG. 10A is a plan view of the display panel. FIG. 10B is a cross-sectional view along A-B and C-D in FIG. 10A. An element substrate 410 is fixed to a sealing substrate 404 with a sealant 405, and includes driver circuit units (a source driver circuit 401 and a gate driver circuit 403) and a pixel portion 402 including a plurality of pixels.

A wiring 408 is a wiring for transmitting signals input to the source driver circuit 401 and the gate driver circuit 403, and receives a video signal, a clock signal, a start signal, a reset signal, and the like from a flexible printed circuit (FPC) 409 serving as an external input terminal. Although only the FPC is illustrated here, a printed wiring board (PWB) may be attached to the FPC. The display panel in this specification includes not only a main body of the display panel but one with an FPC or a PWB attached thereto.

The driver circuit units (the source driver circuit 401 and the gate driver circuit 403) and the pixel portion 402 are formed over the element substrate 410. FIG. 10B illustrates the source driver circuit 401, which is the driver circuit unit, and three pixels in the pixel portion 402.

This embodiment explains an example in which the pixel portion 402 includes pixels of three colors: blue (B) pixels 420a, green (G) pixels 420b, and red (R) pixels 420c. Note that this embodiment is not limited to this example, and a display panel can display multi-color images by including pixels of at least two colors in the pixel portion 402, or alternatively may be a display panel for single color display.

Pixels 420a, 420b, and 420c respectively include color filter layers 434a, 434b, and 434c; light-emitting elements 418a, 418b, and 418c; and transistors 412a, 412b, and 412c that are electrically connected to the light-emitting elements 418a, 418b, and 418c and function as switching transistors. In addition, the transistors 412a, 412b, and 412c overlap with a light-shielding layer 435.

The color filter layer can be provided to correspond to the color of each pixel. For example, the color filter layer 434a of the blue (B) pixel 420a is blue; the color filter layer 434b of the green (G) pixel 420b is green; and the color filter layer 434c of the red (R) pixel 420c is red.

The light-emitting elements 418a, 418b, and 418c include respective reflective electrodes 413a, 413b, and 413c, an EL layer 431, and a light-transmitting electrode 433. Each of the reflective electrodes 413a, 413b, and 413c is used as one of an anode and a cathode, and the light-transmitting electrode 433 is used as the other of the anode and the cathode.

The EL layer 431 has at least a light-emitting layer. The EL layer 431 can have a stacked structure including a hole-injection layer, a hole-transport layer, an electron-transport layer, an electron-injection layer, and/or the like in addition to the light-emitting layer. In addition, a plurality of EL layers may be stacked, and a charge generation layer may be provided between one EL layer and another EL layer. When a plurality of light-emitting layers are stacked between the anode and the cathode, the light-emitting element can emit white light, for example.

Light-transmitting conductive layers 415a, 415b, and 415c may be provided between the respective reflective electrodes 413a, 413b, and 413c and the EL layer 431. The light-transmitting conductive layers 415a, 415b, and 415c have a function of adjusting the optical distance between the reflective electrodes 413a, 413b, and 413c and the light-transmitting electrode 433 in each pixel. By enhancing a desired spectrum with a microcavity for each light-emitting element, a display panel with high color purity can be provided.

FIG. 10B shows the top-emission display panel that includes a combination of light-emitting elements emitting white light and color filters; the display panel can be a top-emission display panel including light-emitting elements formed by a separate coloring method. A separate coloring method is a method by which materials for RGB are applied to respective pixels by evaporation or the like.

When the light-emitting layer is formed as a continuous film instead of being separately formed for every pixel using a metal mask, a reduction in yield and complication of the process due to the use of the metal mask can be avoided. Consequently, a high definition display panel with high color reproducibility can be achieved.

As the source driver circuit 401, a CMOS circuit including a combination of an n-channel transistor 423 and a p-channel transistor 424 is formed. The driver circuit may be constituted by a variety of circuits formed with transistors, such as a CMOS circuit, a PMOS circuit, or an NMOS circuit. This embodiment explains the example in which the source driver circuit and the gate driver circuit are formed over the substrate; however, the structure is not necessarily limited thereto, and part or all of the source driver circuit and the gate driver circuit can be formed outside the substrate instead of over the substrate. In addition, the n-channel transistor 423 and the p-channel transistor 424 overlap with the light-shielding layer 435.

An insulator 414 is formed to cover end portions of the reflective electrodes 413a, 413b, and 413c and the light-transmitting conductive layers 415a, 415b, and 415c. Here, the insulator 414 is formed using a positive type photosensitive acrylic resin film.

In order to improve the coverage, the insulator 414 is provided such that either an upper end portion or a lower end portion of the insulator 414 has a curved surface with a curvature. For example, when positive type photosensitive acrylic is used as a material for the insulator 414, it is preferable that only the upper end portion of the insulator 414 have a curved surface with a curvature radius (0.2 μm to 3 μm). The insulator 414 can be formed using either a negative type which becomes insoluble in an etchant by light irradiation or a positive type which becomes soluble in an etchant by light irradiation.

The sealing substrate 404 is attached to the element substrate 410 with the sealant 405; thus, the light-emitting elements 418a, 418b, and 418c are provided in a space 407 enclosed by the element substrate 410, the sealing substrate 404, and the sealant 405. The space 407 is filled with a filler such as an inert gas (e.g., nitrogen or argon), an organic resin, or the sealant 405. As the organic resin and the sealant 405, materials containing a hygroscopic substance may be used.

Note that as the sealant 405, an epoxy-based resin is preferably used. It is preferable that such a material do not transmit moisture or oxygen as much as possible. As the sealing substrate 404, a glass substrate, a quartz substrate, or a plastic substrate of fiberglass-reinforced plastics (FRP), polyvinyl fluoride (PVF), polyester, acrylic, or the like can be used.

As in this embodiment, an insulating film 411 serving as a base film may be provided between the element substrate 410 and a semiconductor layer of the transistor. The insulating film has a function of preventing diffusion of an impurity element from the element substrate 410, and can be formed with a single-layer structure or a stacked structure using one or more of a silicon nitride film, a silicon oxide film, a silicon nitride oxide film, and a silicon oxynitride film.

In this embodiment, there is no particular limitation on the structure of the transistor applicable to the display panel; for example, a staggered transistor or a planar transistor having a top-gate structure or a bottom-gate structure can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel formation region with a gate insulating layer provided therebetween.

The gate electrode layer can be formed with a single-layer structure or a stacked structure using a metal material such as molybdenum, titanium, chromium, tantalum, tungsten, aluminum, copper, neodymium, or scandium or an alloy material that contains any of these materials as its main component.

For example, as a two-layer structure of the gate electrode layer, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, it is preferable to employ a stacked structure in which a tungsten layer or a tungsten nitride layer, an alloy layer of aluminum and silicon or an alloy layer of aluminum and titanium, and a titanium nitride layer or a titanium layer are stacked.

The gate insulating layer can be formed with a single-layer structure or a stacked structure of a silicon oxide layer, a silicon nitride layer, a silicon oxynitride layer, and/or a silicon nitride oxide layer by plasma CVD, sputtering, or the like. Alternatively, a silicon oxide layer formed by CVD using an organosilane gas can be used as the gate insulating layer. As an organosilane gas, a silicon-containing compound such as tetraethoxysilane (TEOS: $Si(OC_2H_5)_4$), tetramethylsilane (TMS: $Si(CH_3)_4$), tetramethylcyclotetrasiloxane (TMCTS), octamethylcyclotetrasiloxane (OMCTS), hexamethyldisilazane (HMDS), triethoxysilane (SiH$(OC_2H_5)_3$), or tris(dimethylamino)silane (SiH$(N(CH_3)_2)_3$) can be used.

A material of the semiconductor layer is not limited to a particular material and determined in accordance with characteristics needed for the transistors 412a, 412b, 412c, 423, and 424 as appropriate. Examples of a material that can be used for the semiconductor layer will be described.

The semiconductor layer can be formed using the following material: an amorphous semiconductor manufactured by sputtering or vapor-phase growth using a semiconductor material gas typified by silane or germane; a polycrystalline semiconductor formed by crystallizing the amorphous semiconductor with the use of light energy or thermal energy; a microcrystalline semiconductor; or the like. The semiconductor layer can be deposited by sputtering, LPCVD, plasma CVD, or the like.

For the semiconductor layer, a single crystal semiconductor (e.g. single crystal silicon or single crystal silicon carbide) can be used. When a single crystal semiconductor is used for the semiconductor layer, the size of the transistor can be reduced, leading to a higher density of pixels in a display portion. When a single crystal semiconductor is used for the semiconductor layer, an SOI substrate including a single crystal semiconductor layer can be used. Alternatively, a semiconductor substrate such as a silicon wafer may be used.

A typical example of an amorphous semiconductor is hydrogenated amorphous silicon, and a typical example of a crystalline semiconductor is polysilicon. Examples of polysilicon (polycrystalline silicon) are high-temperature polysilicon that contains polysilicon formed at a process temperature of 800° C. or higher as its main component, low-temperature polysilicon that contains polysilicon formed at a process temperature of 600° C. or lower as its main component, and polysilicon obtained by crystallizing amorphous silicon using an element that promotes crystallization or the like. Needless to say, a microcrystalline semiconductor or a semiconductor that includes a crystalline phase in part of a semiconductor layer can be used as described above.

Further, an oxide semiconductor may be used. Examples of an oxide semiconductor are an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are oxides of three metal elements; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, and In—Ga—O-based oxide semiconductor which are oxides of two metal elements; and an In—O-based oxide semiconductor, a Sn—O-based oxide semiconductor, and a Zn—O-based oxide semiconductor which are oxides of one metal element. Moreover, $SiO_2$ may be contained in the above oxide semiconductor. Here, for example, the In—Ga—Zn—O-based oxide semiconductor means an oxide containing at least In, Ga, and Zn, and there is no particular limitation on the composition ratio of the elements. The In—Ga—Zn—O-based oxide semiconductor may contain an element other than In, Ga, and Zn.

For the oxide semiconductor layer, a thin film expressed by a chemical formula of $InMO_3(ZnO)_m$ (m>0) can be used. Here, M represents one or more metal elements selected from Ga, Al, Mn, and Co. For example, M can be Ga, Ga and Al, Ga and Mn, or Ga and Co.

In the case where an In—Zn—O-based material is used as the oxide semiconductor, the atomic ratio is In/Zn=0.5 to 50, preferably In/Zn=1 to 20, further preferably In/Zn=1.5 to 15. When the atomic ratio of Zn is in the above preferred range, the field-effect mobility of the transistor can be improved. Here, when the atomic ratio of the compound is In:Zn:O=X:Y:Z, the relation Z>1.5X+Y is satisfied.

As the oxide semiconductor layer, it is possible to use an oxide semiconductor layer that has neither a single crystal structure nor an amorphous structure and is composed of the CAAC-OS.

Examples of a material of wiring layers serving as source and drain electrode layers are an element selected from Al, Cr, Ta, Ti, Mo, and W; an alloy containing any of the above elements as its component; and an alloy film containing a combination of any of these elements. Further, in the case where heat treatment is performed, the conductive film preferably has heat resistance against the heat treatment. Since the use of aluminum alone brings disadvantages such as low heat resistance and a tendency to corrosion, aluminum is used in combination with a conductive material having heat resistance. As the conductive material having heat resistance, which is used in combination with aluminum, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy containing a combination of any of these elements, or a nitride containing any of these elements as its component.

As an insulating film 419 that covers the transistor, an inorganic insulating film or an organic insulating film formed by a dry method or a wet method can be used. For example, it is possible to use a silicon nitride film, a silicon oxide film, a silicon oxynitride film, an aluminum oxide film, a tantalum oxide film, or a gallium oxide film formed by CVD, sputtering, or the like. Moreover, an organic material such as polyimide, acrylic, benzocyclobutene, polyamide, or an epoxy resin can be used. Other than such organic materials, it is also possible to use a low-dielectric constant material (a low-k material), a siloxane-based resin, PSG (phosphosilicate glass), BPSG (borophosphosilicate glass), or the like.

Note that a siloxane-based resin corresponds to a resin including a Si—O—Si bond formed using a siloxane-based material as a starting material. A siloxane-based resin may include an organic group (e.g., an alkyl group or an aryl group) or a fluoro group as a substituent. In addition, the organic group may include a fluoro group. A siloxane-based resin is applied by a coating method and baked; thus, the insulating film 419 can be formed.

Note that the insulating film 419 may be formed by stacking a plurality of insulating films each formed using any of the above materials. For example, the insulating film 419 may have a structure in which an organic resin film is stacked over an inorganic insulating film.

Figure 11A:
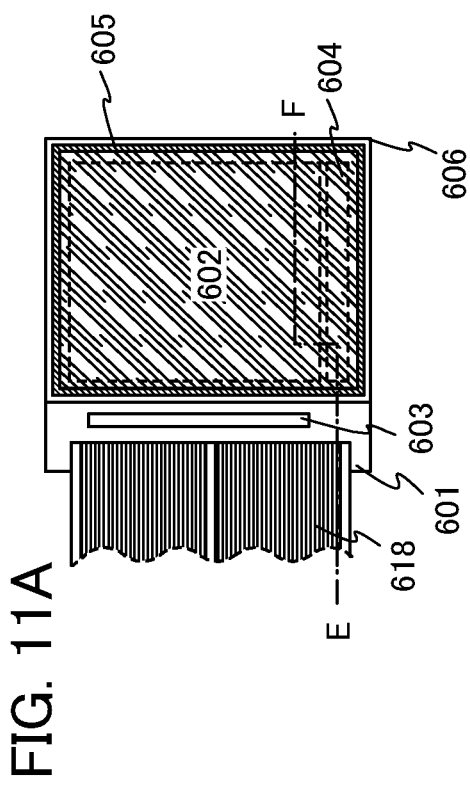
FIGS. 11A and 11B illustrate one embodiment of a display panel.
Figure 11B:
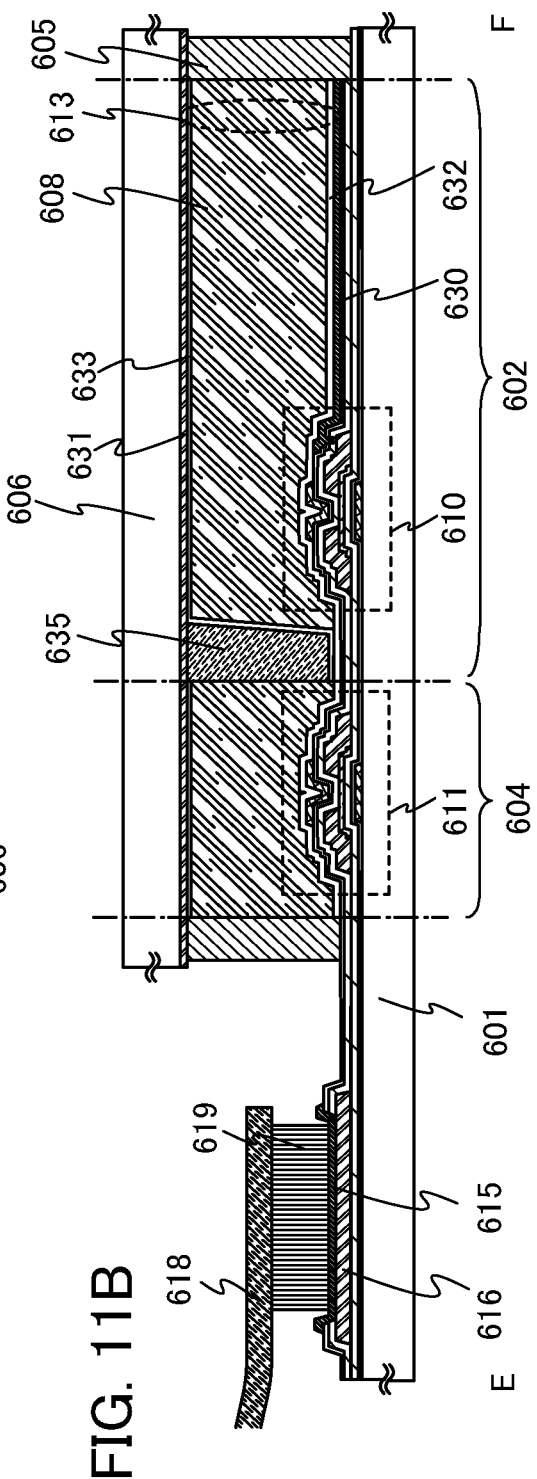

FIGS. 11A and 11B illustrate an example of a display panel including a liquid crystal element as a display element. FIG. 11A is a plan view of a display panel, and FIG. 11B is a cross-sectional view along E-F in FIG. 11A. The structure of the panel including the liquid crystal element shown in this embodiment can be employed as the structure of the shutter panel as appropriate.

In FIGS. 11A and 11B, a sealant 605 is provided so as to surround a pixel portion 602 and a scan line driver circuit 604 which are provided over a first substrate 601. A second substrate 606 is provided over the pixel portion 602 and the scan line driver circuit 604. Thus, the pixel portion 602 and the scan line driver circuit 604 are sealed together with a liquid crystal layer 608 by the first substrate 601, the sealant 605, and the second substrate 606.

In FIG. 11A, a signal line driver circuit 603 that is formed using a single crystal semiconductor film or a polycrystalline semiconductor film over a substrate separately prepared is mounted in a region different from the region surrounded by the sealant 605 over the first substrate 601. A variety of signals and potentials are supplied to the signal line driver circuit 603, the scan line driver circuit 604, and the pixel portion 602 from an FPC 618.

In FIGS. 11A and 11B, the display panel includes a connection terminal electrode 615 and a terminal electrode 616. The connection terminal electrode 615 and the terminal electrode 616 are electrically connected to a terminal of the FPC 618 via an anisotropic conductive film 619. The connection terminal electrode 615 is formed using the same conductive film as a first electrode layer 630 of the liquid crystal element, and the terminal electrode 616 is formed using the same conductive film as source and drain electrodes of transistors 610 and 611.

The pixel portion 602 and the scan line driver circuit 604, which are provided over the first substrate 601, each include a plurality of transistors. FIG. 11B illustrates the transistor 610 included in the pixel portion 602 and the transistor 611 included in the scan line driver circuit 604.

In FIG. 11B, a liquid crystal element 613, which is the display element, includes the first electrode layer 630, a second electrode layer 631, and the liquid crystal layer 608. Insulating films 632 and 633 serving as alignment films are provided so that the liquid crystal layer 608 is sandwiched therebetween. The second electrode layer 631 is provided on the second substrate 606 side, and the first electrode layer 630 and the second electrode layer 631 are stacked with the liquid crystal layer 608 placed therebetween.

A columnar spacer 635 is obtained by selective etching of an insulating film. The spacer is provided to control the thickness (cell gap) of the liquid crystal layer 608. Alternatively, a spherical spacer may be used.

In the case where a liquid crystal element is used as the display element, thermotropic liquid crystal, low-molecular liquid crystal, high-molecular liquid crystal, polymer dispersed liquid crystal, ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition that includes a liquid crystal showing a blue phase and a chiral agent has a short response time of 1 ms (millisecond) or less and has optical isotropy; therefore, the alignment process is not necessary and viewing angle dependence is small. In addition, since an alignment film does not need to be provided and rubbing treatment is unnecessary, electrostatic discharge caused by the rubbing treatment can be prevented and defects and damage of the display panel can be reduced in the manufacturing process. Thus, the productivity of the display panel can be increased.

The specific resistivity of the liquid crystal material is $1 \times 10^9$ Ω·cm or more, preferably $1 \times 10^{11}$ Ω·cm or more, further preferably $1 \times 10^{12}$ Ω·cm or more. The value of the specific resistivity in this specification is measured at 20° C.

For the display panel including the liquid crystal elements (the liquid crystal display panel), a twisted nematic (TN) mode, an in-plane-switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used.

The display panel in this embodiment can be a normally black liquid crystal display panel such as a transmissive liquid crystal display panel utilizing a vertical alignment (VA) mode. The vertical alignment mode is a method of controlling alignment of liquid crystal molecules of a liquid crystal display panel, in which liquid crystal molecules are aligned vertically to a panel surface when no voltage is applied. There are some examples of the vertical alignment mode, and for instance, a multi-domain vertical alignment (MVA) mode, a patterned vertical alignment (PVA) mode, or an advanced super view (ASV) mode can be employed. Moreover, it is possible to use a method called domain multiplication or multi-domain design, in which a pixel is divided into several regions (subpixels) and molecules are aligned in different directions in their respective regions.

In the display panel described in this embodiment, a black matrix (a light-shielding layer), an optical member (an optical substrate) such as a polarizing member, a retardation member, or an anti-reflection member, and the like are provided as appropriate. For example, circular polarization may be obtained by using a polarizing substrate and a retardation substrate. In addition, a backlight, a side light, or the like may be used as a light source for the liquid crystal display panel.

As a display method in the pixel portion, a progressive method, an interlace method, or the like can be employed. Further, color elements controlled in a pixel at the time of color display are not limited to three colors: R, G, and B (R, G, and B correspond to red, green, and blue). For example, R, G, B, and W (W corresponds to white); or R, G, B, and one or more of yellow, cyan, magenta, and the like can be used. Note that the size of display regions may be different between dots of color elements. This embodiment is not limited to the application to a display panel for color display but can also be applied to a display panel for monochrome display.

The display device according to one embodiment of the present invention can be provided by applying the display panel described in this embodiment to the display panel in Embodiment 1.

This embodiment can be implemented in appropriate combination with the structures described in the other embodiments.

Embodiment 4

The display device according to one embodiment of the present invention can be used for laptops and image reproducing devices provided with recording media (typically, devices that reproduce the content of recording media such as digital versatile discs (DVDs) and have displays for displaying the reproduced images). Other examples of electronic devices that can include the display device according to one embodiment of the present invention are mobile phones, portable game consoles, personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), and vending machines. In this embodiment, specific examples of such electronic devices will be described with reference to FIGS. 12A to 12C.

Figure 12A:
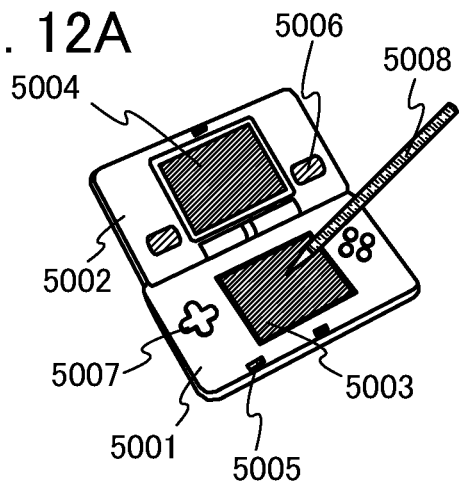
FIGS. 12A to 12C illustrate embodiments of electronic devices.

FIG. 12A illustrates a portable game console including a housing 5001, a housing 5002, a display portion 5003, a display portion 5004, a microphone 5005, speakers 5006, operation keys 5007, and a stylus 5008. The display device according to one embodiment of the present invention can be used as the display portion 5003 or the display portion 5004. By using the display device according to one embodiment of the present invention as the display portion 5003 or the display portion 5004, it is possible to provide a highly convenient portable game console capable of displaying 3D images. Although the portable game console in FIG. 12A has the two display portions 5003 and 5004, the number of display portions included in a portable game console is not limited to this.

Figure 12B:
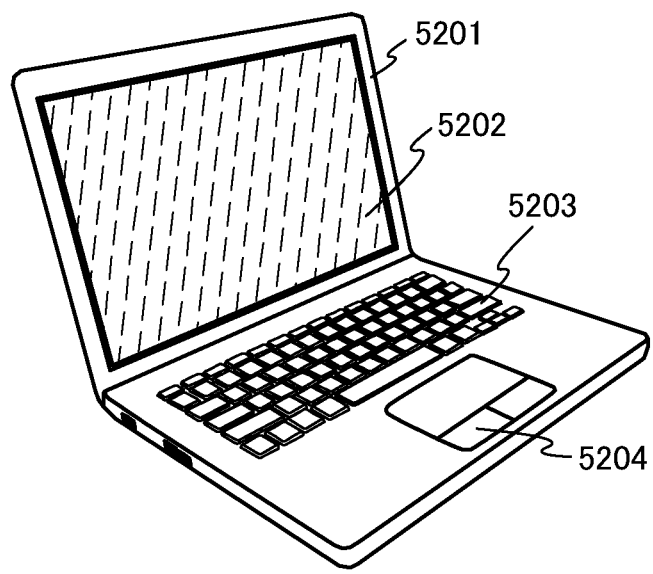

FIG. 12B illustrates a laptop personal computer including a housing 5201, a display portion 5202, a keyboard 5203, and a pointing device 5204. The display device according to one embodiment of the present invention can be used for the display portion 5202. By using the display device according to one embodiment of the present invention as the display portion 5202, it is possible to provide a highly convenient laptop personal computer capable of displaying 3D images.

Figure 12C:
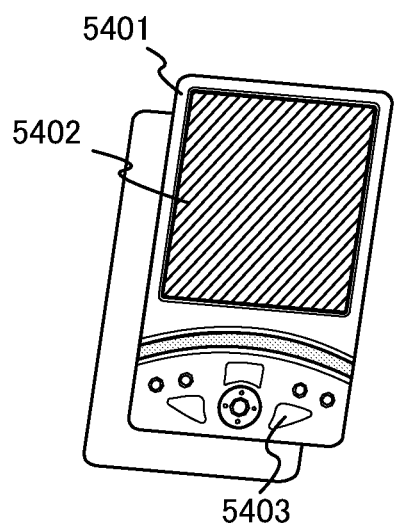

FIG. 12C illustrates a personal digital assistant including a housing 5401, a display portion 5402, and operation keys 5403. The display device according to one embodiment of the present invention can be used as the display portion 5402. By using the display device according to one embodiment of the present invention as the display portion 5402, it is possible to provide a highly convenient personal digital assistant capable of displaying 3D images.

This embodiment can be implemented in appropriate combination with the structures described in the other embodiments.

EXPLANATION OF REFERENCE

10: display panel, 20: shutter panel, 20A: substrate, 20B: substrate, 31: left eye, 32: right eye, 100: pixel, 201: electrode, 202: transistor, 203: control circuit, 204: electrode, 205: transistor, 206: control circuit, 211: liquid crystal layer, 212: insulating layer, 213: semiconductor layer, 214: optical shutter region, 214A: black portion, 214B: white portion, 215: semiconductor layer, 216: insulating layer, 300: display device, 301: viewer, 302: display portion, 303: distance sensor, 304: angular sensor, 311: display panel, 312: shutter panel, 313: application processor, 314: display panel control circuit, 315: shutter panel control circuit, 316: sensor control circuit, 317: circuit, 318: memory, 401: source driver circuit, 402: pixel portion, 403: gate driver circuit, 404: sealing substrate, 405: sealant, 407: space, 408: wiring, 409: FPC (flexible printed circuit), 410: element substrate, 411: insulating film, 412a: transistor, 413a: electrode, 414: insulator, 415a: conductive layer, 418a: light-emitting element, 419: insulating film, 420a: pixel, 420b: pixel, 420c: pixel, 423: n-channel transistor, 424: p-channel transistor, 431: EL layer, 433: electrode, 434a: color filter layer, 434b: color filter layer, 434c: color filter layer, 435: light-shielding layer, 501: substrate, 502: gate electrode layer, 503: gate insulating layer, 504: conductive layer, 505: conductive layer, 506: electrode layer, 507: insulating layer, 508: insulating layer, 509: contact hole, 510: substrate, 532: gate electrode layer, 536: electrode layer, 550: capacitor, 551: capacitor, 601: substrate, 602: pixel portion, 603: signal line driver circuit, 604: scan line driver circuit, 605: sealant, 606: substrate, 608: liquid crystal layer, 610: transistor, 611: transistor, 613: liquid crystal element, 615: connection terminal electrode, 616: terminal electrode, 618: FPC, 619: anisotropic conductive film, 630: electrode layer, 631: electrode layer, 632: insulating film, 635: spacer, 5001: housing, 5002: housing, 5003: display portion, 5004: display portion, 5005: microphone, 5006: speaker, 5007: operation key, 5008: stylus, 5201: housing, 5202: display portion, 5203: keyboard, 5204: pointing device, 5401: housing, 5402: display portion, 5403: operation key This application is based on Japanese Patent Application serial No. 2011-039734 filed with Japan Patent Office on Feb. 25, 2011, the entire contents of which are hereby incorporated by reference.

The invention claimed is:

1. A display device comprising:
    a sensor configured to detect a distance between the display device and a viewer;
    a display panel including a plurality of pixels arranged in a matrix; and
    a shutter panel adjacent to the display panel, and including:
        a first substrate with first electrodes arranged in a stripe pattern, each first electrode being connected to a transistor including an oxide semiconductor layer;
        a second substrate provided with second electrodes arranged in a stripe pattern; and
        a liquid crystal layer sandwiched between the first electrode and the second electrode,
    wherein off state currents per micrometer of channel width of the transistors are $1 \times 10^{-22}$ A or less,
    wherein the display device is configured to control light emission of the pixels and electric potentials applied to the first electrodes in accordance with the distance,
    wherein an area transmitting light through the shutter panel is variable in accordance with the distance,
    wherein, in a first retention state, the display panel is configured to perform a first 3D display with each of the pixels functioning individually as one display element unit, and
    wherein, in a second retention state, the display panel is configured to perform a second 3D display with at least two pixels functioning together as one display element unit.

2. The display device according to claim 1, further comprising a shutter panel control circuit electrically connected to the transistors;
    wherein the shutter panel control circuit is configured not to output a signal when the distance does not change, or when a 2D image is displayed; and
    wherein, when no signal is output from the shutter panel control circuit, the electric potentials are retained.

3. The display device according to claim 1,
    wherein each second electrode is electrically connected to a transistor including an oxide semiconductor layer.

4. The display device according to claim 1,
    wherein the transistors share one gate electrode.

5. The display device according to claim 1, further comprising capacitors each electrically connected to a corresponding one of the first electrodes;
    wherein the capacitors share an electrode layer.

6. The display device according to claim 1,
    wherein the transistors are configured to maintain the electric potentials applied to the first electrodes when turned off.

7. The display device according to claim 1,
    wherein the transistors are configured to maintain respective electric potentials applied to each of respective first electrodes when turned off; and
    wherein the oxide semiconductor layer comprises a crystalline oxide semiconductor with c-axis orientation.

8. An electronic device including the display device according to claim 1.

9. The display device according to claim 1,
    wherein the plurality of pixels comprises a first pixel and a second pixel functioning together as one display element unit, and
    wherein the first pixel is configured to express black while sub-pixels of the second pixel express at least one of red, green, and blue.

10. The display device according to claim 1,
    wherein the plurality of pixels comprises:
        a first pixel and a second pixel functioning together as one display element unit; and
        a third pixel and a fourth pixel functioning together as one display element unit,
    wherein the first pixel, the second pixel, the third pixel, and the fourth pixel each includes a first sub-pixel, a second sub-pixel, and a third sub-pixel,
    wherein the first sub-pixel and the second sub-pixel of the first pixel are configured to express black while the first sub-pixel, the second sub-pixel, and the third sub-pixel of the second pixel and the third sub-pixel of the first pixel express at least one of red, green, and blue, and
    wherein the second sub-pixel and the third sub-pixel of the fourth pixel are configured to express black while the first sub-pixel, the second sub-pixel, and the third sub-pixel of the third pixel and the first sub-pixel of the fourth pixel express at least one of red, green, and blue.

11. The display device according to claim 1,
    wherein at least one of the first electrodes has a width different from that of the other first electrodes, and
    wherein at least one of the second electrodes has a width different from that of the other second electrodes.

12. A display device comprising:
    a sensor configured to detect a distance between the display device and a viewer;
    a display panel including a plurality of pixels arranged in a matrix; and
    a shutter panel adjacent to the display panel, and including:
        a first substrate with first electrodes arranged in a stripe pattern, each first electrode being connected to a transistor including an oxide semiconductor layer;
        a second substrate provided with second electrodes arranged in a stripe pattern; and
        a liquid crystal layer sandwiched between the first electrode and the second electrode,
    wherein off state currents per micrometer of channel width of the transistors are $1 \times 10^{-22}$ A or less,
    wherein an area transmitting light through the shutter panel is variable in accordance with the distance,
    wherein, in a first retention state, the display panel is configured to perform a first 3D display with each of the pixels functioning individually as one display element unit,
    wherein, in a second retention state, the display panel is configured to perform a second 3D display with at least two pixels functioning together as one display element unit,
    wherein the display device is configured to control light emission of the pixels and electric potentials applied to the first electrodes in accordance with the distance, and
    wherein a number of pixels functioning as one display element unit decreases when the distance increases.

13. The display device according to claim 12, further comprising a shutter panel control circuit electrically connected to the transistors;
    wherein the shutter panel control circuit is configured not to output a signal when the distance does not change, or when a 2D image is displayed; and
    wherein, when no signal is output from the shutter panel control circuit, the electric potentials are retained.

14. The display device according to claim 12,
    wherein each second electrode is electrically connected to a transistor including an oxide semiconductor layer.

15. The display device according to claim 12,
    wherein the transistors share one gate electrode.

16. The display device according to claim 12, further comprising capacitors each electrically connected to a corresponding one of the first electrodes;
wherein the capacitors share an electrode layer.

17. The display device according to claim 12,
wherein the transistors are configured to maintain the electric potentials applied to the first electrodes when turned off.

18. The display device according to claim 12,
wherein the transistors are configured to maintain respective electric potentials applied to each of respective first electrodes when turned off; and
wherein the oxide semiconductor layer comprises a crystalline oxide semiconductor with c-axis orientation.

19. An electronic device including the display device according to claim 12.

20. The display device according to claim 12,
wherein the plurality of pixels comprises a first pixel and a second pixel functioning together as one display element unit, and
wherein the first pixel is configured to express black while sub-pixels of the second pixel express at least one of red, green, and blue.

21. The display device according to claim 12,
wherein the plurality of pixels comprises:
a first pixel and a second pixel functioning together as one display element unit; and
a third pixel and a fourth pixel functioning together as one display element unit,
wherein the first pixel, the second pixel, the third pixel, and the fourth pixel each includes a first sub-pixel, a second sub-pixel, and a third sub-pixel,
wherein the first sub-pixel and the second sub-pixel of the first pixel are configured to express black while the first sub-pixel, the second sub-pixel, and the third sub-pixel of the second pixel and the third sub-pixel of the first pixel express at least one of red, green, and blue, and
wherein the second sub-pixel and the third sub-pixel of the fourth pixel are configured to express black while the first sub-pixel, the second sub-pixel, and the third sub-pixel of the third pixel and the first sub-pixel of the fourth pixel express at least one of red, green, and blue.

22. The display device according to claim 12,
wherein at least one of the first electrodes has a width different from that of the other first electrodes, and
wherein at least one of the second electrodes has a width different from that of the other second electrodes.

* * * * *